United States Patent
Wang et al.

(10) Patent No.: US 11,863,585 B2
(45) Date of Patent: *Jan. 2, 2024

(54) COALITION NETWORK IDENTIFICATION USING ITERATIVE PROCESS

(71) Applicant: Yahoo Assets LLC, Dulles, VA (US)

(72) Inventors: Ruichen Wang, Champaign, IL (US); Timothy Michael Olson, Mahomet, IL (US); Yan Han, Champaign, IL (US); Jian Tian, Champaign, IL (US); Robert Jason Harris, Urbana, IL (US); Shaima Abdul Majeed, Champaign, IL (US)

(73) Assignee: YAHOO ASSETS LLC, Dulles, VA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/102,790

(22) Filed: Jan. 30, 2023

(65) Prior Publication Data

US 2023/0179625 A1 Jun. 8, 2023

Related U.S. Application Data

(63) Continuation of application No. 17/203,251, filed on Mar. 16, 2021, now Pat. No. 11,567,813, which is a
(Continued)

(51) Int. Cl.
*G06F 9/54* (2006.01)
*H04L 9/40* (2022.01)
*H04L 67/306* (2022.01)
*H04N 21/262* (2011.01)
*G06F 18/22* (2023.01)
*G06F 18/21* (2023.01)

(52) U.S. Cl.
CPC .......... *H04L 63/1458* (2013.01); *G06F 9/542* (2013.01); *G06F 18/217* (2023.01); *G06F 18/22* (2023.01); *H04L 67/306* (2013.01); *H04N 21/26208* (2013.01)

(58) Field of Classification Search
None
See application file for complete search history.

(56) References Cited

U.S. PATENT DOCUMENTS

2015/0207813 A1* 7/2015 Reybok ................. H04L 63/145 726/22
2020/0265100 A1* 8/2020 Hu ....................... G06F 16/9577

* cited by examiner

*Primary Examiner* — Craig C Dorais
(74) *Attorney, Agent, or Firm* — Cooper Legal Group LLC

(57) ABSTRACT

One or more computing devices, systems, and/or methods are provided. Event information associated with a plurality of events may be identified. The plurality of events may be associated with first entities corresponding to a first entity type and second entities associated with a second entity type. A first network profile associated with the first entities and the second entities may be generated based upon the event information. An iterative process may be performed to identify a coalition network associated with fraudulent activity. The iterative process may include analyzing the first network profile to identify a first set of entities, of the first entities, that are related to an entity of the second entities, and/or analyzing the first network profile to identify a second set of entities, of the second entities, that are related to the first set of entities. Multiple iterations may be performed to identify the coalition network.

20 Claims, 15 Drawing Sheets

Related U.S. Application Data continuation of application No. 16/845,355, filed on Apr. 10, 2020, now Pat. No. 10,949,269.

COALITION NETWORK IDENTIFICATION USING ITERATIVE PROCESS

CROSS REFERENCE TO RELATED APPLICATIONS

This application claims priority to and is a continuation of U.S. application Ser. No. 17/203,251, filed on Mar. 16, 2021, entitled "COALITION NETWORK IDENTIFICATION USING ITERATIVE PROCESS", which claims priority to and is a continuation of U.S. application Ser. No. 16/845,355, filed on Apr. 10, 2020, entitled "COALITION NETWORK IDENTIFICATION USING ITERATIVE PROCESS". U.S. application Ser. No. 17/203,251 and U.S. application Ser. No. 16/845,355 are incorporated by reference herein in their entirety.

BACKGROUND

Many applications, such as websites, applications, etc. may provide platforms for viewing media. For example, a request for media may be received from a device associated with a user. Responsive to receiving the request for media, media may be transmitted to the device. However, the request for media may be fraudulent.

SUMMARY

In accordance with the present disclosure, one or more computing devices and/or methods are provided. In an example, a first plurality of sets of event information associated with a first plurality of events may be identified. The first plurality of events may be associated with a first plurality of entities corresponding to a first entity type and a second plurality of entities corresponding to a second entity type. A first set of event information of the first plurality of sets of event information may be associated with a first event of the first plurality of events. The first set of event information may be indicative of a first entity, of the first plurality of entities, associated with the first event. The first set of event information may be indicative of a second entity, of the second plurality of entities, associated with the first event. A first network profile associated with the first plurality of entities and the second plurality of entities may be generated based upon the first plurality of sets of event information. The first network profile may be indicative of one or more first sets of event metrics associated with the first entity and one or more entities comprising the second entity. The second plurality of entities may comprise the one or more entities. A first set of event metrics of the one or more first sets of event metrics may correspond to a measure of events associated with the first entity and the second entity. A first plurality of representations associated with the first plurality of entities may be generated based upon the first network profile. A second plurality of representations associated with the second plurality of entities may be generated based upon the first network profile. A first plurality of clusters in the first plurality of representations may be identified. A first cluster of the first plurality of clusters may correspond to a first set of representations of the first plurality of representations. A second plurality of clusters in the second plurality of representations may be identified. A second cluster of the second plurality of clusters may correspond to a second set of representations of the second plurality of representations. The first network profile may be analyzed to determine that a first set of entities associated with the first cluster and a second set of entities associated with the second cluster are related. A coalition network associated with fraudulent activity may be identified based upon the determination that the first set of entities and the second set of entities are related.

In an example, a first plurality of sets of event information associated with a first plurality of events may be identified. The first plurality of events may be associated with a first plurality of entities corresponding to a first entity type and a second plurality of entities corresponding to a second entity type. A first set of event information of the first plurality of sets of event information may be associated with a first event of the first plurality of events. The first set of event information may be indicative of a first entity, of the first plurality of entities, associated with the first event. The first set of event information may be indicative of a second entity, of the second plurality of entities, associated with the first event. A first network profile associated with the first plurality of entities and the second plurality of entities may be generated based upon the first plurality of sets of event information. The first network profile may be indicative of one or more first sets of event metrics associated with the first entity and one or more entities comprising the second entity. The second plurality of entities may comprise the one or more entities. A first set of event metrics of the one or more first sets of event metrics may correspond to a measure of events associated with the first entity and the second entity. A first plurality of representations associated with a third plurality of entities may be generated based upon the first network profile. The third plurality of entities may comprise the first plurality of entities and the second plurality of entities. A first plurality of clusters in the first plurality of representations may be identified. A first cluster of the first plurality of clusters may correspond to a first set of representations of the first plurality of representations. The first set of representations may be associated with a first set of entities of the first plurality of entities and a second set of entities of the second plurality of entities. A coalition network associated with fraudulent activity may be identified based upon the first set of entities and the second set of entities.

In an example, a first plurality of sets of event information associated with a first plurality of events may be identified. The first plurality of events may be associated with a first plurality of entities corresponding to a first entity type and a second plurality of entities corresponding to a second entity type. A first set of event information of the first plurality of sets of event information may be associated with a first event of the first plurality of events. The first set of event information may be indicative of a first entity, of the first plurality of entities, associated with the first event. The first set of event information may be indicative of a second entity, of the second plurality of entities, associated with the first event. A first network profile associated with the first plurality of entities and the second plurality of entities may be generated based upon the first plurality of sets of event information. The first network profile may be indicative of one or more first sets of event metrics associated with the second entity and a first set of entities comprising the first entity. The first plurality of entities may comprise the first set of entities. A first set of event metrics of the one or more first sets of event metrics may correspond to a measure of events associated with the first entity and the second entity. The first network profile may be analyzed to identify the first set of entities, of the first plurality of entities, that are related to the second entity. The first network profile may be analyzed to identify a second set of entities, of the second plurality of entities, that are related to the first set of entities. The first network profile may be analyzed to identify a third set of entities, of the first plurality of entities, that are related to the second set of entities. Multiple iterations may be performed. An iteration of the multiple iterations may comprise at least one of analyzing the first network profile to identify a first output set of entities, of the second plurality of entities, that are related to a first input set of entities, or analyzing the first network profile to identify a second output set of entities, of the first plurality of entities, that are related to the first output set of entities. For an initial iteration of the multiple iterations, the first input set of entities may correspond to the third set of entities. For an iteration, of the multiple iterations, following the initial iteration, the first input set of entities may correspond to the second output set of entities identified in a preceding iteration of the multiple iterations. The multiple iterations may be performed until at least one of a difference between the first output set of entities identified in a first iteration of the multiple iterations and the first output set of entities identified in a second iteration of the multiple iterations does not exceed a first threshold difference, or a difference between the second output set of entities identified in a third iteration of the multiple iterations and the second output set of entities identified in a fourth iteration of the multiple iterations does not exceed a second threshold difference. A coalition network associated with fraudulent activity may be identified based upon one or more first entities identified in the first iteration, the second iteration, the third iteration and/or the fourth iteration.

In an example, a first plurality of sets of event information associated with a first plurality of events may be identified. The first plurality of events may be associated with a first plurality of entities corresponding to a first entity type and a second plurality of entities corresponding to a second entity type. A first set of event information of the first plurality of sets of event information may be associated with a first event of the first plurality of events. The first set of event information may be indicative of a first entity, of the first plurality of entities, associated with the first event. The first set of event information may be indicative of a second entity, of the second plurality of entities, associated with the first event. The first plurality of sets of event information may be analyzed to identify a first set of entities, of the first plurality of entities, that are related to the second entity. The first set of entities may comprise the first entity. The first plurality of sets of event information may be analyzed to identify a second set of entities, of the second plurality of entities, that are related to the first set of entities. The first plurality of sets of event information may be analyzed to identify a third set of entities, of the first plurality of entities, that are related to the second set of entities. Multiple iterations may be performed. An iteration of the multiple iterations may comprise at least one of analyzing the first plurality of sets of event information to identify a first output set of entities, of the second plurality of entities, that are related to a first input set of entities, or analyzing the first plurality of sets of event information to identify a second output set of entities, of the first plurality of entities, that are related to the first output set of entities. For an initial iteration of the multiple iterations, the first input set of entities may correspond to the third set of entities. For an iteration, of the multiple iterations, following the initial iteration, the first input set of entities may correspond to the second output set of entities identified in a preceding iteration of the multiple iterations. The multiple iterations may be performed until at least one of a difference between the first output set of entities identified in a first iteration of the multiple iterations and the first output set of entities identified in a second iteration of the multiple iterations does not exceed a first threshold difference, or a difference between the second output set of entities identified in a third iteration of the multiple iterations and the second output set of entities identified in a fourth iteration of the multiple iterations does not exceed a second threshold difference. A coalition network associated with fraudulent activity may be identified based upon one or more first entities identified in the first iteration, the second iteration, the third iteration and/or the fourth iteration.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
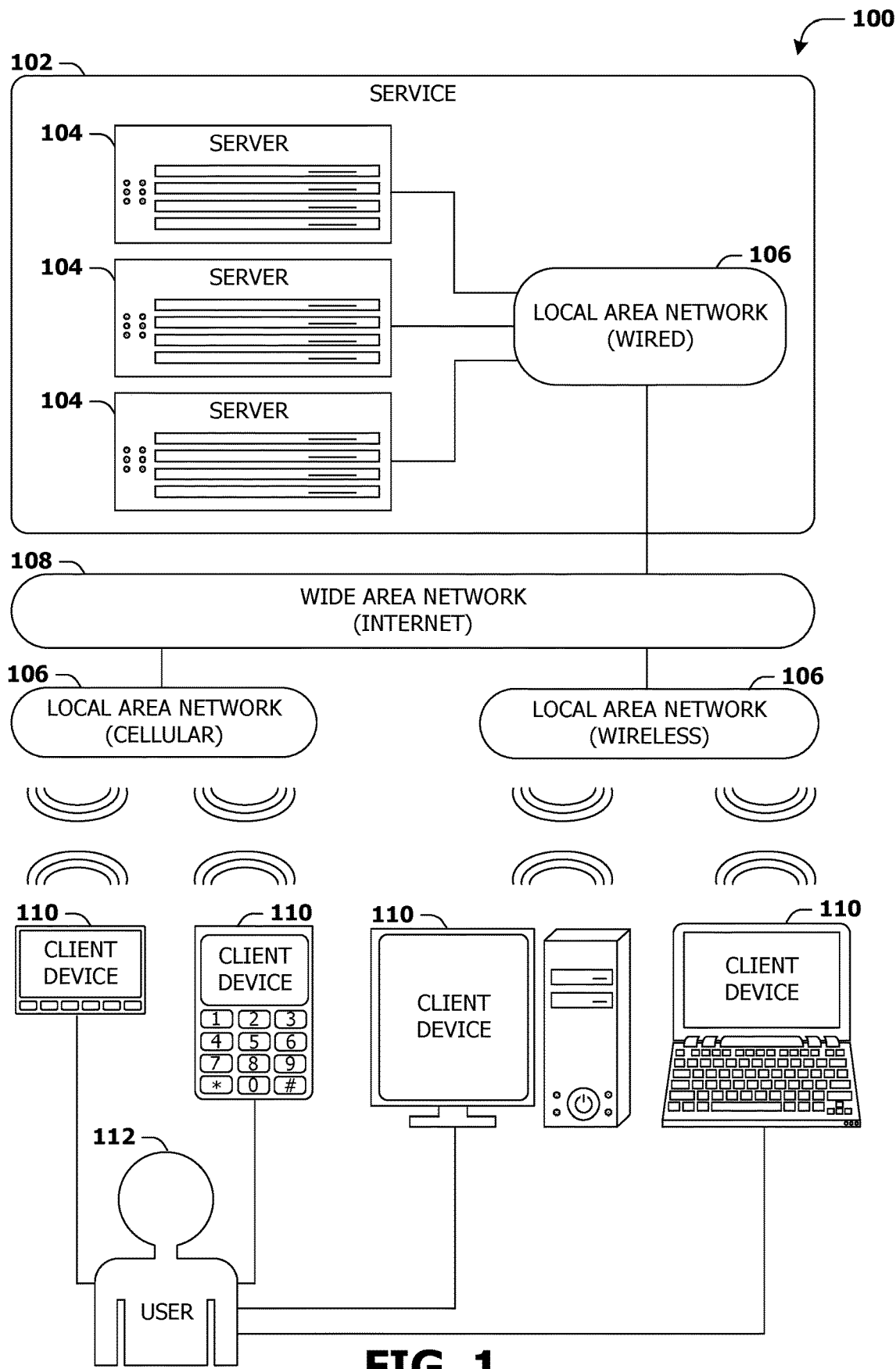
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
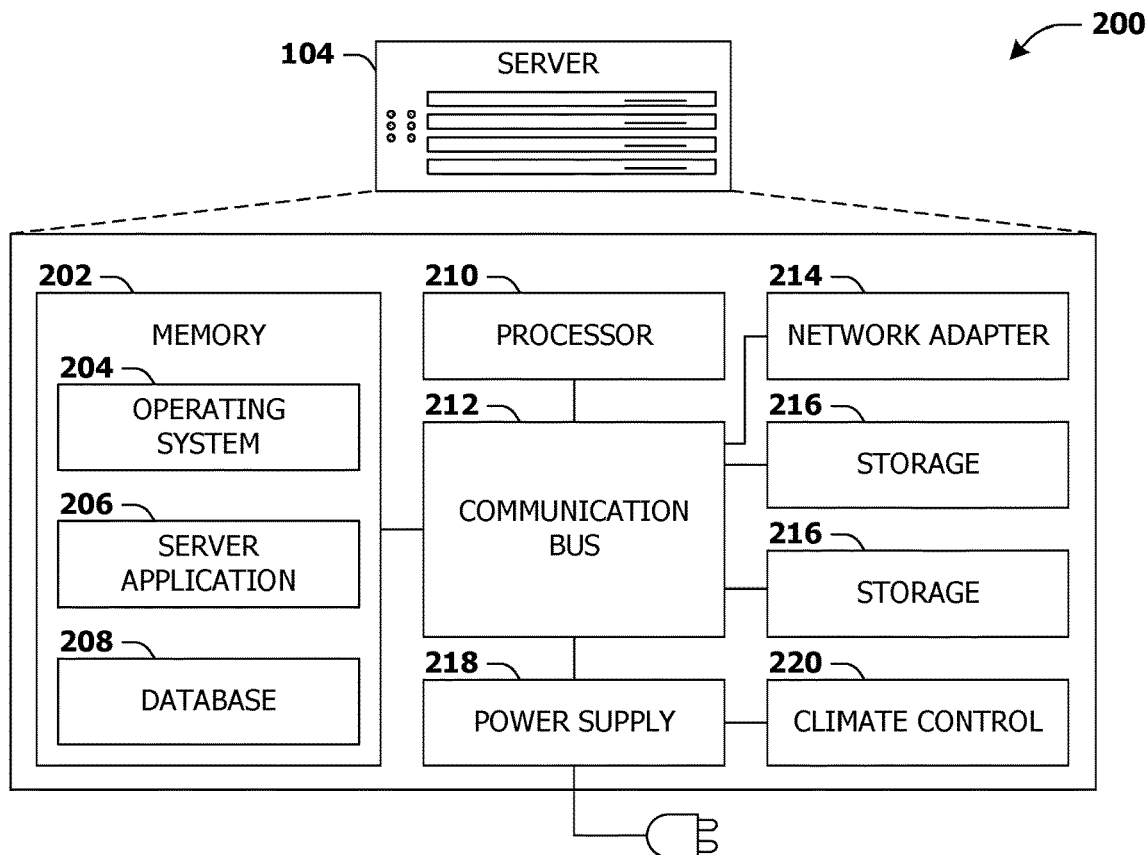
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
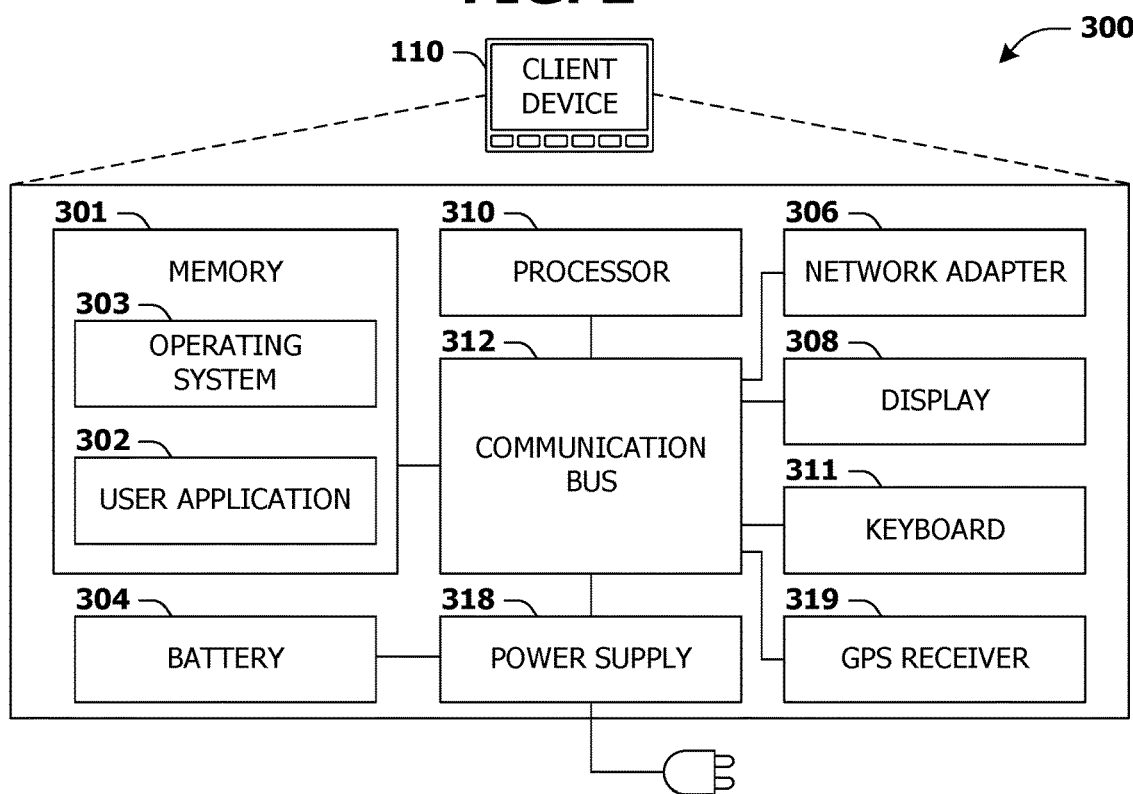
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for identifying coalition networks associated with fraudulent activity are provided. A coalition network is a network of entities, such as internet resources (e.g., websites, web pages, domains, applications, etc.) and/or clients (e.g., client devices, IP addresses, etc.), working together to perform fraudulent activity. An example of such fraudulent activity may include, but is not limited to, advertising fraud. Other examples of fraudulent activity performed by coalition networks are data fraud, spam messaging, etc. In advertising fraud, advertisement signals associated with internet resources and clients of the coalition network may be received by an advertising system. The advertisement signals may indicate advertisement impressions, clicks, conversions, etc. performed by a client of the coalition network in association with an internet resource of the coalition network. However, the purported advertisement impressions, clicks, conversions, etc. may not be performed by legitimate users having an interest in relevant advertisements. Rather, the advertisement signals may be transmitted to the advertising system by a system of the coalition network employing at least one of botnets, hacked client devices (e.g., zombie computers), click farms, fake websites, data centers, etc. Administrators of the coalition network may request compensation for the purported advertisement impressions, clicks, conversions, etc., and, unless the coalition network is identified and determined to perform fraudulent activity, the administrators may continue being compensated. Advertising fraud is estimated to cost the advertising industry billions of dollars per year and automated and/or real-time solutions to advertising fraud are needed.

Some systems for detecting fraudulent activity attempt to detect fraud at an entity-level and/or an event-level. For example, such systems may analyze activity and/or traffic associated with a device and/or an advertisement signal to determine, such as based upon computation limits, whether the device and/or the advertisement signal is fraudulent. However, malicious entities develop workarounds to avoid detection by such systems, such as by using automated programs to spread fraudulent traffic across networks of compromised or malicious systems (e.g., botnets). For example, the automated programs may operate such that each individual bot looks sufficiently like a legitimate user in order to avoid triggering event-level and/or entity-level detectors.

Accordingly, there is a need for techniques and systems for detecting fraudulent activity on a network-level. Thus, in accordance with one or more of the techniques presented herein, a first plurality of sets of event information associated with a first plurality of events may be identified. The first plurality of events may be associated with a first plurality of entities corresponding to a first entity type and a second plurality of entities corresponding to a second entity type. A first set of event information of the first plurality of sets of event information may be associated with a first event of the first plurality of events. The first set of event information may be indicative of a first entity, of the first plurality of entities, associated with the first event. The first set of event information may be indicative of a second entity, of the second plurality of entities, associated with the first event. A first network profile associated with the first plurality of entities and the second plurality of entities may be generated based upon the first plurality of sets of event information. The first network profile may be indicative of one or more first sets of event metrics associated with the first entity and one or more entities comprising the second entity. A coalition network associated with fraudulent activity may be identified based upon the first plurality of sets of event information and/or the first network profile using one or more of the techniques described herein, such as by using one or more clustering techniques and/or by performing one or more iterative processes.

Figure 4:
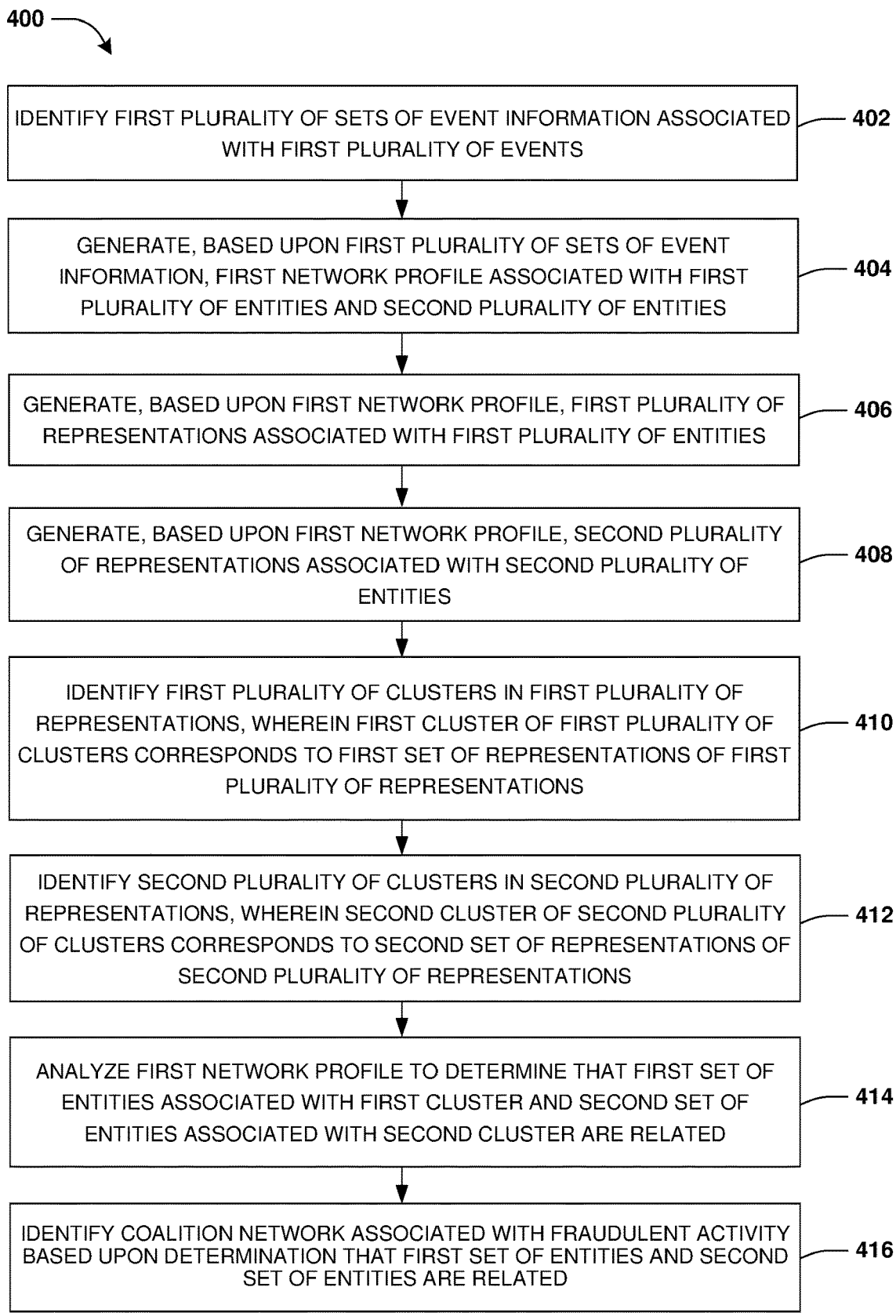
FIG. 4 is a flow chart illustrating an example method for identifying coalition networks.

An embodiment of identifying coalition networks is illustrated by an example method 400 of FIG. 4. A content system for presenting content via devices may be provided. In some examples, the content system may be an advertisement system (e.g., an online advertising system). Alternatively and/or additionally, the content system may not be an advertisement system. In some examples, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

At 402, a first plurality of sets of event information associated with a first plurality of events may be identified. The first plurality of events may be associated with a first plurality of entities corresponding to a first entity type and a second plurality of entities corresponding to a second entity type. In some examples, the first plurality of events may correspond to events that occur within a first period of time.

In some examples, the first plurality of entities corresponds to client-side (and/or user-side) entities. For example, an entity of the first plurality of entities may be associated with a client device. The first type of entity may correspond to at least one of a client device, a device identifier associated with a device, an IP address associated with a device, a carrier identifier indicative of carrier information associated with a device, a user identifier (e.g., at least one of a username, an email address, a user account identifier, etc.) associated with a device, a browser cookie, etc.

In some examples, the second plurality of entities corresponds to internet resource-side (and/or publisher-side) entities. For example, an entity of the second plurality of entities may be associated with an internet resource, such as at least one of a web page, a website, an application (e.g., a client application, a mobile application, a platform, etc.). The second type of entity may correspond to at least one of an internet resource, an internet resource identifier associated with an internet resource, a host device associated with an internet resource (e.g., the host device may comprise one or more computing devices, storage and/or a network configured to host the internet resource), a host identifier of the host device, a domain (e.g., a domain name, a top-level domain, etc.) associated with an internet resource, an application identifier associated with an application, a publisher identifier associated with a publisher of an internet resource, etc.

In some examples, an event of the first plurality of events (and/or each event of the first plurality of events) may correspond to activity performed by an entity of the first plurality of entities and/or an entity of the second plurality of entities. In an example, an event of the first plurality of events (and/or each event of the first plurality of events) may correspond to a presentation of a content item (e.g., presentation of an advertisement and/or an advertisement impression), a selection of the content item (e.g., an advertisement click), and/or a conversion event associated with the content item, where the content item may be provided by the content system.

A first set of event information of the first plurality of sets of event information may be associated with a first event of the first plurality of events. The first set of event information may be indicative of a first entity (e.g., a client-side entity), of the first plurality of entities, associated with the first event. The first set of event information may be indicative of a second entity (e.g., an internet resource-side entity), of the second plurality of entities, associated with the first event.

FIGS. 5A-5H illustrate examples of a system 501 for identifying coalition networks, described with respect to the method 400 of FIG. 4. FIGS. 5A-5E illustrate examples of the first event associated with the first entity and the second entity. The first entity may be associated with a first client device 500 associated with a first user. The second entity may be associated with one or more first internet resources comprising a fourth web page 544 (illustrated in FIG. 5E). In an example, where the second entity corresponds to a domain, the one or more first internet resources may correspond to one or more web pages matching the domain. The first user (and/or the first client device 500) may access and/or interact with a service, such as a browser, software, a website, an application, an operating system, an email interface, a messaging interface, a music-streaming application, a video application, etc. that provides a platform for accessing internet resources and/or viewing and/or downloading content from a server associated with the content system. In some examples, the content system may use device information associated with the first client device 500, such as at least one of activity information associated with the first client device 500, demographic information associated with the first user, location information associated with the first client device 500, etc. to select content for presentation to the first user.

Figure 5A:
FIG. 5A is a component block diagram illustrating an example system for identifying coalition networks, where a first client device presents and/or accesses a first web page using a browser.

FIG. 5A illustrates the first client device 500 presenting and/or accessing a first web page 508 using a browser of the first client device 500. The browser may comprise an address bar 502 comprising a web address (e.g., a uniform resource locator (URL)) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

Figure 5B:
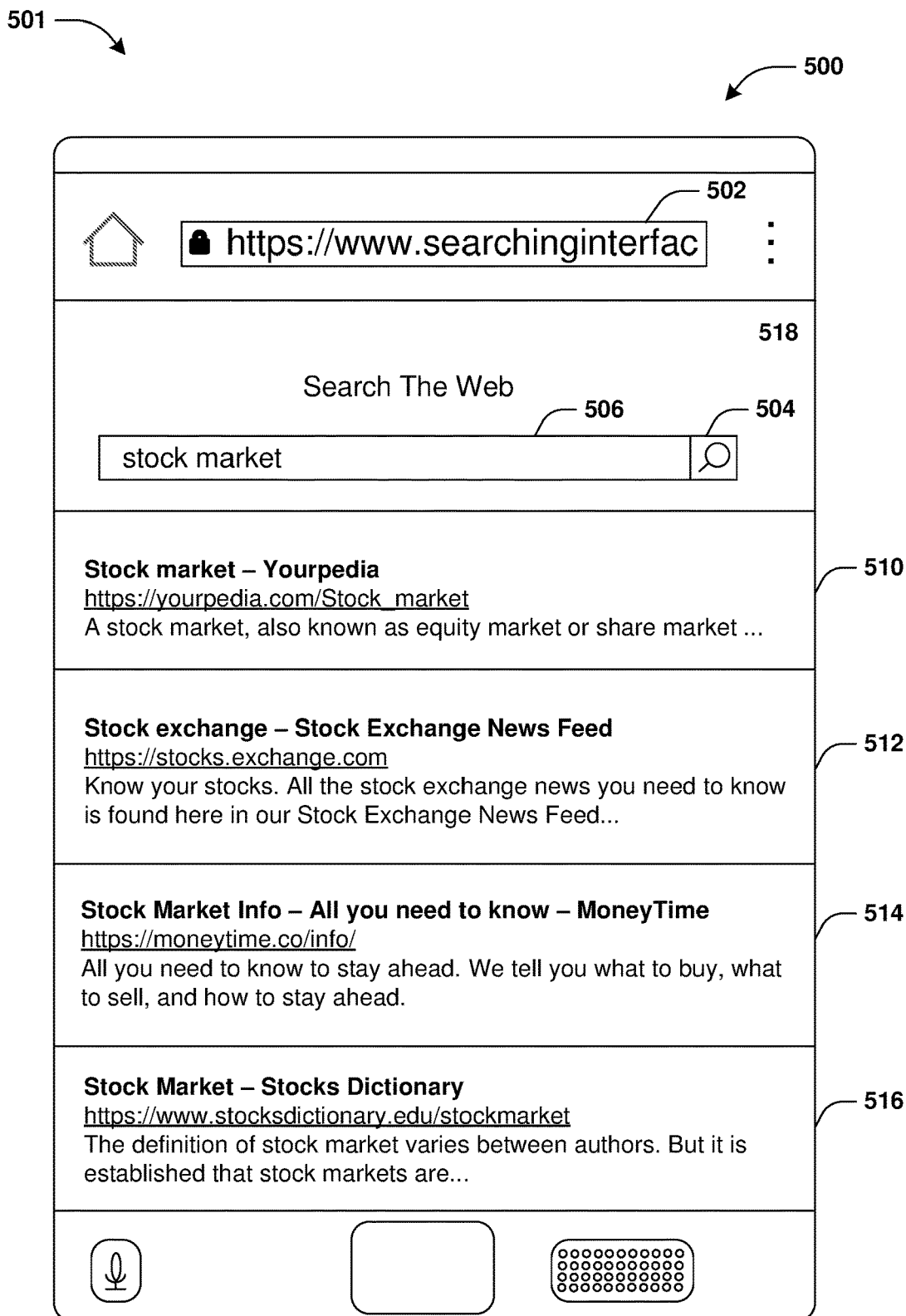
FIG. 5B is a component block diagram illustrating an example system for identifying coalition networks, where a first client device presents a plurality of search results associated with a query.

FIG. 5B illustrates the first client device 500 presenting a plurality of search results associated with the query using the browser of the first client device 500. For example, the plurality of search results may be presented within a second web page 518. For example, the plurality of search results may comprise a first search result 510 corresponding to a third web page, a second search result 512 corresponding to the fourth web page 544 (illustrated in FIG. 5E), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 544 may be selected (e.g., the second search result 512 may be selected via a second selectable input corresponding to the second search result 512).

Figure 5C:
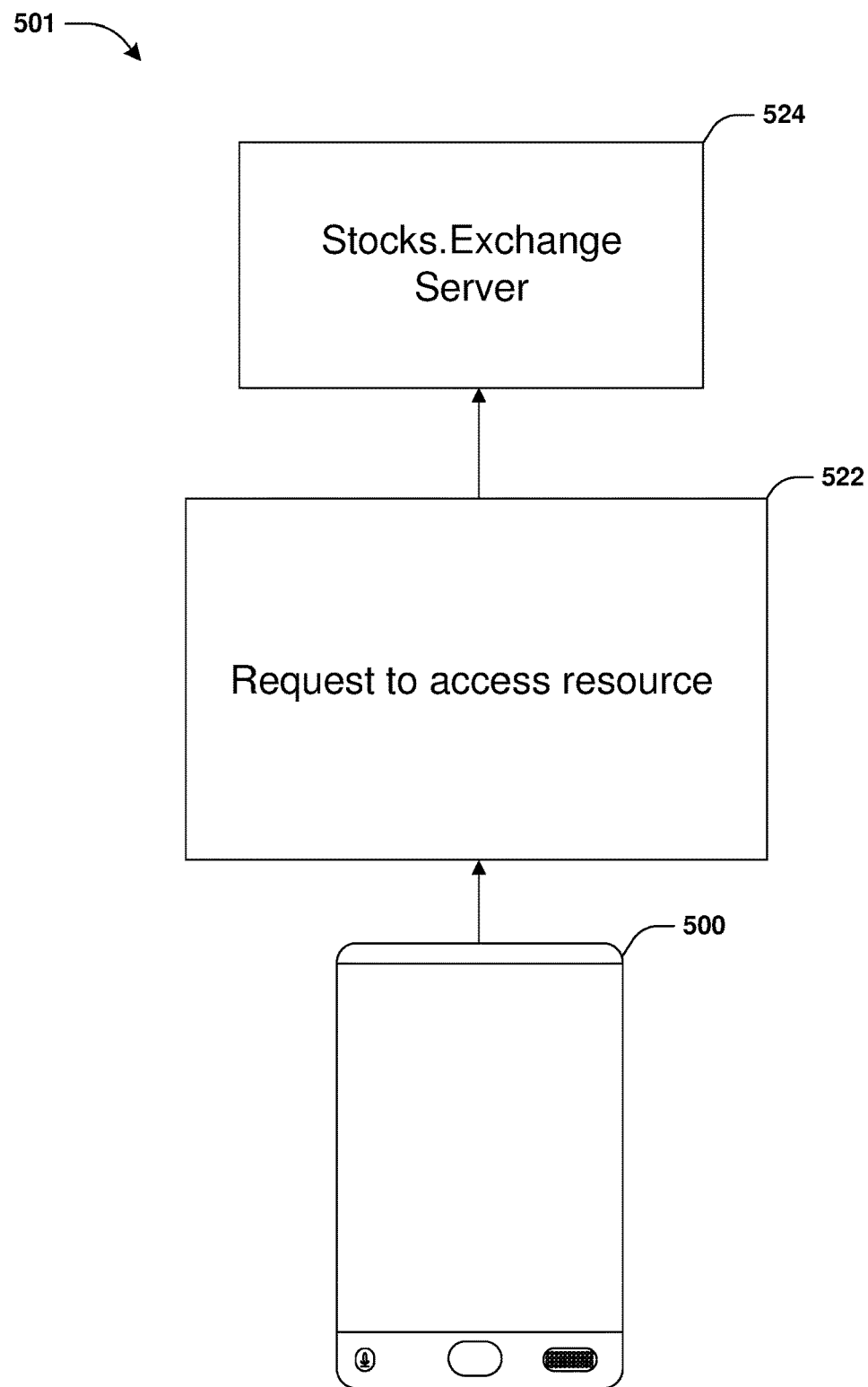
FIG. 5C is a component block diagram illustrating an example system for identifying coalition networks, where a first client device transmits a request to access a resource to a server.

FIG. 5C illustrates the first client device 500 transmitting a request 522 to access a resource to a first server 524. In some examples, the request 522 to access the resource may be transmitted responsive to the second search result 512 being selected. For example, the resource may correspond to the fourth web page 544. For example, the request 522 to access the resource may comprise an indication of the fourth web page 544 (e.g., a web address "https://stocks.exchange.com"). Alternatively and/or additionally, the first server 524 may be associated with the fourth web page 544.

Figure 5D:
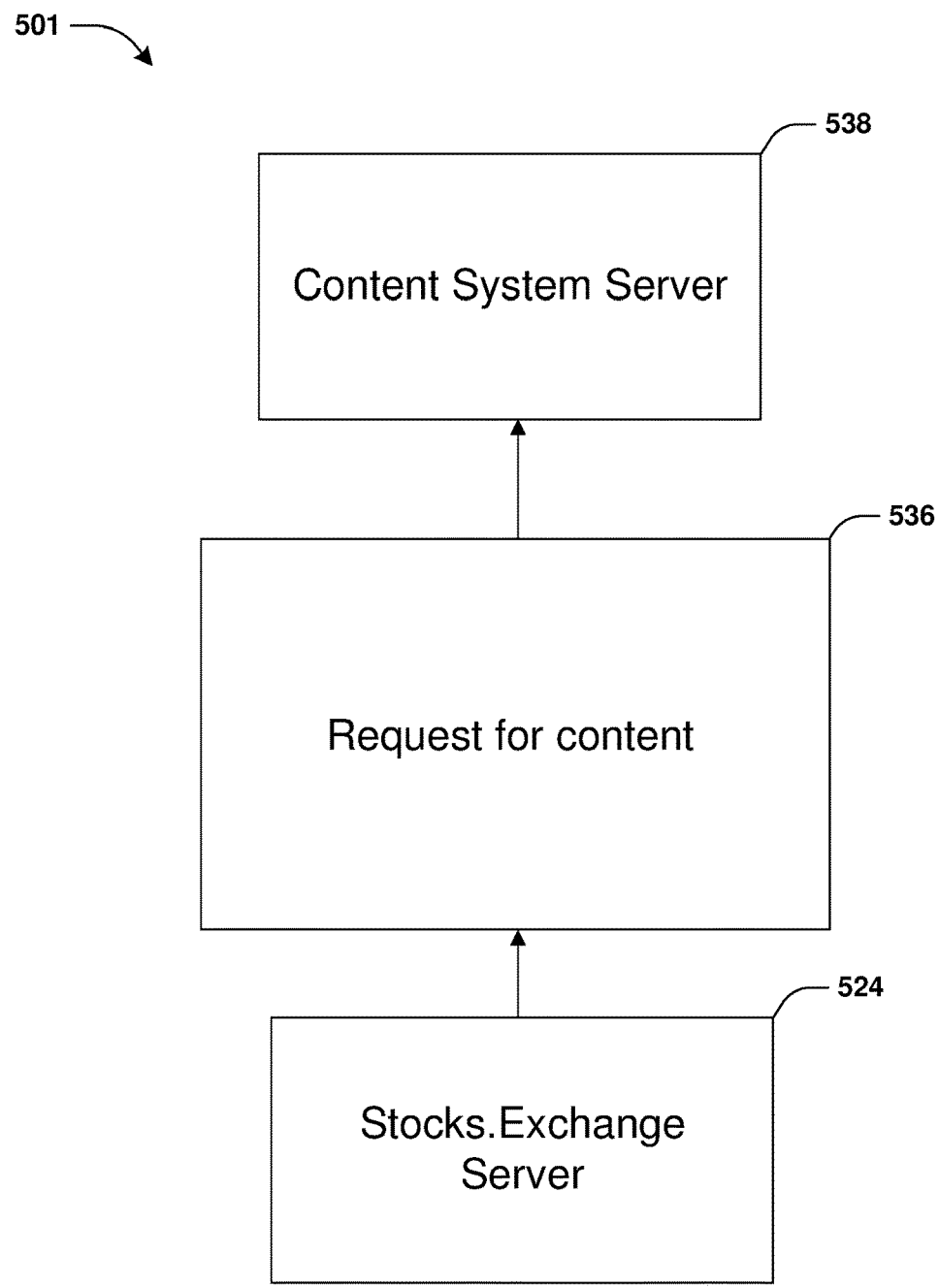
FIG. 5D is a component block diagram illustrating an example system for identifying coalition networks, where a first server transmits a first request for content to a second server associated with a content system.

FIG. 5D illustrates the first server 524 transmitting a first request for content 536 to a second server 538 associated with the content system. In some examples, the first request for content 536 may be transmitted (by the first server 524) responsive to receiving the request 522 to access the resource. Alternatively and/or additionally, the first request for content 536 may be transmitted (to the second server 538) by the first client device 500. In some examples, the first request for content 536 may be a request to be provided with a content item (e.g., an advertisement, an image, a link, a video, etc.) for presentation via the fourth web page 544.

In some examples, the first request for content 536 may comprise an indication of the first entity, such as at least one of a device identifier associated with the first client device 500, an IP address associated with the first client device 500, a carrier identifier indicative of carrier information associated with the first client device 500, a user identifier (e.g., at least one of a username, an email address, a user account identifier, etc.) associated with the first client device 500, a browser cookie, etc. Alternatively and/or additionally, the first request for content 536 may comprise an indication of the second entity (e.g., "stocks.exchange.com"), such as at least one of an internet resource identifier associated with the fourth web page 544, a domain associated with the fourth web page 544, a host identifier of a host device associated with the fourth web page 544, a publisher identifier associated with a publisher of the fourth web page 544, etc. Accordingly, the first entity and/or the second entity may be determined based upon the first request for content 536.

In some examples, responsive to receiving the first request for content 536, a bidding process may be performed to select a content item from a first plurality of content items participating in an auction (e.g., an auction for selection of a content item to present via the first client device 500). In some examples, the first plurality of content items (participating in the auction) may comprise a first content item 546 (illustrated in FIG. 5E).

In some examples, a first plurality of bid values associated with the first plurality of content items may be determined. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items. In some examples, the first plurality of bid values may comprise a first bid value associated with the first content item 546.

In some examples, the first content item 546 may be selected from the first plurality of content items for presentation via the first client device 500 based upon the first plurality of bid values. For example, the first content item 546 may be selected from the first plurality of content items based upon a determination that the first bid value associated with the first content item 546 exceeds a threshold bid value. Alternatively and/or additionally, the first content item 546 may be selected from the first plurality of content items based upon a determination that the first bid value is greater than one or more other bid values of the first plurality of bid values. Alternatively and/or additionally, the first content item 546 may be selected from the first plurality of content items based upon a determination that the first bid value is a highest bid value of the first plurality of bid values.

Alternatively and/or additionally, a first plurality of content item scores associated with the first plurality of content items may be determined. For example, the first plurality of content items scores may be determined based upon the first plurality of bid values and/or a first plurality of click probabilities associated with the first plurality of content items. In some examples, the first content item 546 may be selected from the first plurality of content items for presentation via the first client device 500 based upon the first plurality of content item scores. For example, the first content item 546 may be selected from the first plurality of content items based upon a determination that a first content item score associated with the first content item 546 exceeds a threshold content item score. Alternatively and/or additionally, the first content item 546 may be selected from the first plurality of content items based upon a determination that the first content item score is greater than one or more other content item scores of the first plurality of content item scores. Alternatively and/or additionally, the first content item 546 may be selected from the first plurality of content items based upon a determination that the first content item score is a highest content item score of the first plurality of content item scores.

Figure 5E:
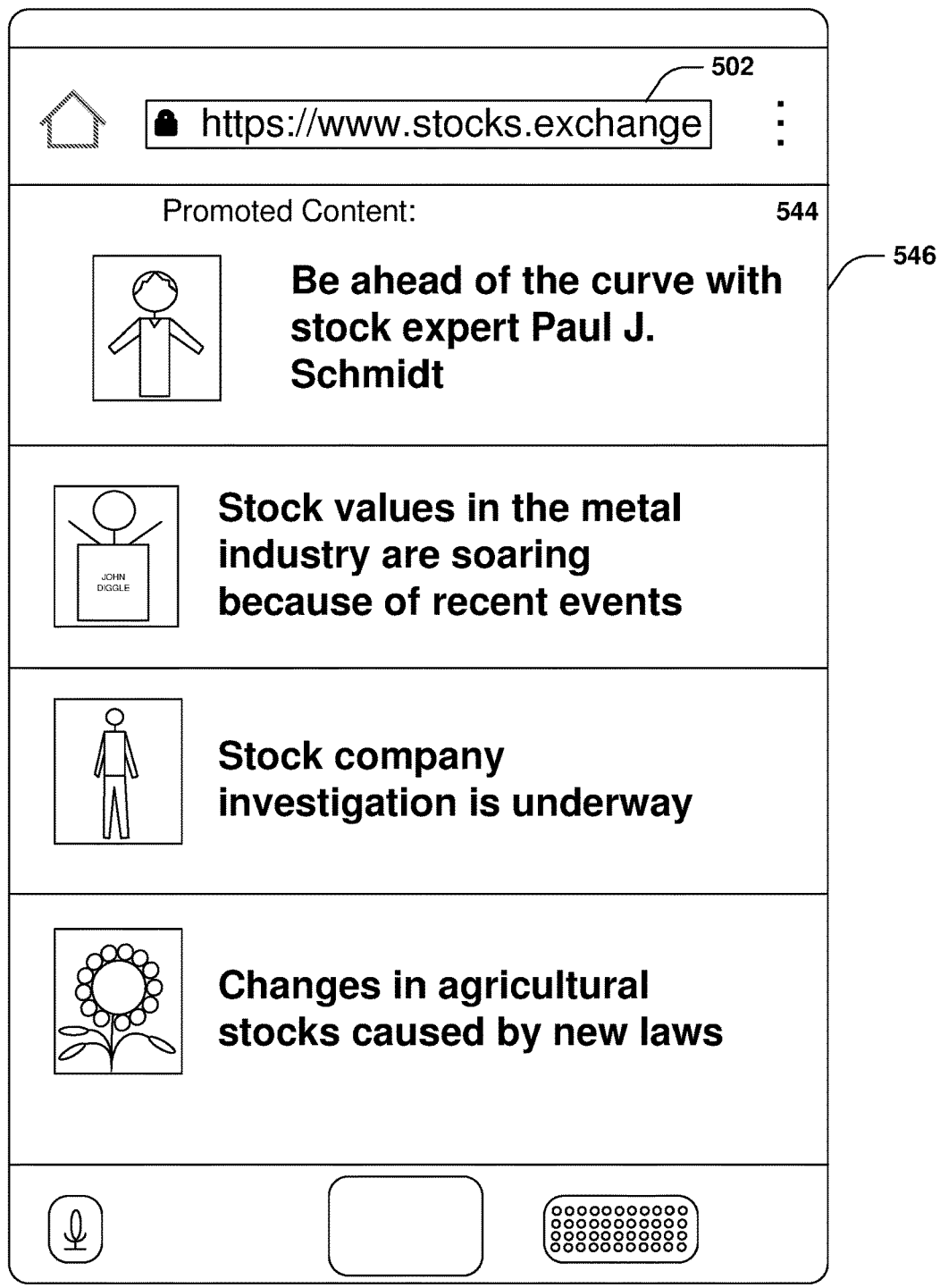
FIG. 5E is a component block diagram illustrating an example system for identifying coalition networks, where a first client device presents and/or accesses a fourth web page using a browser.

In some examples, responsive to selecting the first content item 546 for presentation via the first client device 500, the first content item 546 may be transmitted to the first client device 500 for presentation via the fourth web page 544. FIG. 5E illustrates the first client device 500 presenting and/or accessing the fourth web page 544 using the browser. For example, the content system may provide the first content item 546 to be presented via the fourth web page 544 while the fourth web page 544 is accessed by the first client device 500.

In an example where events of the first plurality of events comprise presentations of content, the first event of the first plurality of events may be detected by determining that the first content item 546 is presented via the first client device 500. Alternatively and/or additionally, the first event may be detected by receiving a signal indicative of the first content item 546 being presented via the first client device 500. For example, the first set of event information, indicative of the first event, may be stored responsive to determining that the first content item 546 is presented via the first client device 500 and/or responsive to receiving the signal.

In an example where events of the first plurality of events comprise presentations of threshold proportions of content items, the first event may be detected by determining that at least a threshold proportion of the first content item 546 is presented and/or displayed via the first client device 500. Alternatively and/or additionally, the first event may be detected by receiving a signal indicative of the threshold proportion of the first content item 546 being presented and/or displayed via the first client device 500. For example, the first set of event information, indicative of the first event, may be stored responsive to determining that the threshold proportion of the first content item 546 is presented via the first client device 500 and/or responsive to receiving the signal.

In an example where events of the first plurality of events comprise selections of content (e.g., advertisement clicks), the first event may be detected by detecting a selection of the first content item 546 via the first client device 500. Alternatively and/or additionally, the first event may be detected by receiving a signal indicative of the first content item 546 being selected via the first client device 500. For example, the first set of event information, indicative of the first event, may be stored responsive to detecting the selection of the first content item 546 and/or responsive to receiving the signal.

In an example where events of the first plurality of events correspond to conversion events, the first event may be detected by detecting a first conversion event associated with the first content item 546 and the first client device 500. Alternatively and/or additionally, the first event may be detected by receiving a signal indicative of the first conversion event. For example, the first set of event information, indicative of the first event, may be stored responsive to detecting the first conversion event and/or responsive to receiving the signal.

In some examples, the first conversion event may be associated with a third entity associated with the first content item 546. The third entity may correspond to a third entity type. The third entity type may correspond to advertising-side entities, such as at least one of advertisements, creatives, advertisers, companies, brands, organizations, etc. associated with content items presented by the content system. For example, the third entity may correspond to at least one of the first content item 546, a creative, an advertisement, an advertiser, a company, a brand, an organization, etc. The first content item 546 (and/or one or more other content items associated with a content campaign) may be used for promoting one or more products and/or one or more services.

In some examples, the first conversion event may correspond to at least one of a purchase of a product of one or more products associated with the third entity, a purchase of a service of one or more services associated with the third entity, subscribing to (and/or signing up for) a service associated with the third entity, contacting the third entity (e.g., contacting the third entity via one or more of email, phone, etc.), a selection of a content item associated with the third entity, an interaction with a content item associated with the third entity, accessing a web page associated with the third entity, adding a product and/or a service associated with the third entity to a shopping cart on an online shopping platform, completing a form (e.g., a survey form), creating and/or registering an account (e.g., a user account) for a platform associated with the third entity (e.g., creating a shopping user account for an online shopping platform), downloading an application (e.g., a mobile application) associated with the third entity onto the first client device 500 and/or installing the application on the first client device 500, opening and/or interacting with the application, utilizing one or more services associated with the third entity using the application, etc.

In some examples, the first set of event information of the first plurality of sets of event information may be indicative of the first content item 546 (e.g., the first set of event information may comprise a content item identifier associated with the first content item 546), a first time that the first event occurs, the first entity and/or the second entity. Alternatively and/or additionally, the first plurality of sets of event information may comprise indications of a third plurality of entities, comprising an indication of the third entity, corresponding to the third entity type (e.g., advertising-side entities). For example, the first set of event information may be indicative of the third entity associated with the first content item 546.

At 404, a first network profile associated with the first plurality of entities and/or the second plurality of entities may be generated based upon the first plurality of sets of event information. In some examples, the first network profile may be indicative of event metrics associated with entities of the first plurality of entities and/or the second plurality of entities, such as a rate at which events associated with a client-side entity and an internet resource-side entity occur, and/or a quantity of events associated with a client-side entity and an internet resource-side entity.

In some examples, the first network profile is indicative of one or more first sets of event metrics associated with the first entity and one or more first entities comprising the second entity. For example, the one or more first entities may correspond to one or more internet resource-side entities of the second plurality of entities.

In some examples, a first set of event metrics of the one or more first sets of event metrics may correspond to a measure of events associated with the first entity and the second entity. The events associated with the first entity and the second entity may comprise the first event. Alternatively and/or additionally, an event associated with the first entity and the second entity may be associated with a presentation of a content item (e.g., an advertisement) via the first client device 500 using an internet resource of the one or more first internet resources associated with the second entity. Alternatively and/or additionally, an event associated with the first entity and the second entity may be associated with a presentation of a threshold proportion of a content item (e.g., an advertisement) via the first client device 500 using an internet resource of the one or more first internet resources associated with the second entity. Alternatively and/or additionally, an event associated with the first entity and the second entity may be associated with a selection of a content item (e.g., an advertisement) via the first client device 500 using an internet resource of the one or more first internet resources associated with the second entity. Alternatively and/or additionally, an event associated with the first entity and the second entity may correspond to a conversion event associated with a content item (e.g., an advertisement) that is presented via the first client device 500 using an internet resource of the one or more first internet resources associated with the second entity.

The first set of event metrics may be indicative of a first event rate at which events associated with the first entity and the second entity occur, such as during the first period of time. In an example, the first event rate may correspond to a quantity of events associated with the first entity and the second entity per unit of time (e.g., per day, per week and/or per a different unit of time). In an example, the first event rate may correspond to five events per day (e.g., on average, five events associated with the first entity and the second entity may occur per day). Alternatively and/or additionally, the first set of event metrics may be indicative of a first quantity of events associated with the first entity and the second entity, such as during the first period of time. In an example, the first event rate may be determined based upon a duration of the first period of time and/or the first quantity of events associated with the first entity and the second entity.

In some examples, the one or more first entities associated with the one or more first sets of event metrics may comprise entities, of the second plurality of entities, with which the first entity performed at least one event of the first plurality of events. For example, the first plurality of sets of event information may be analyzed based upon the first entity to identify the one or more first entities with which the first entity performed at least one event of the first plurality of events.

Alternatively and/or additionally, the one or more first entities associated with the one or more first sets of event metrics may comprise entities, of the second plurality of entities, with which the first entity performed events, amounting to at least a threshold quantity of events, of the first plurality of events. For example, the first plurality of sets of event information may be analyzed based upon the first entity and the threshold quantity of events to identify the one or more first entities with which the first entity performed events, amounting to at least the threshold quantity events, of the first plurality of events.

In some examples, for each entity of the one or more first entities, a set of event metrics associated with the first entity and the entity may be determined (based upon the first plurality of sets of event information) and included in the first network profile.

Figure 5F:
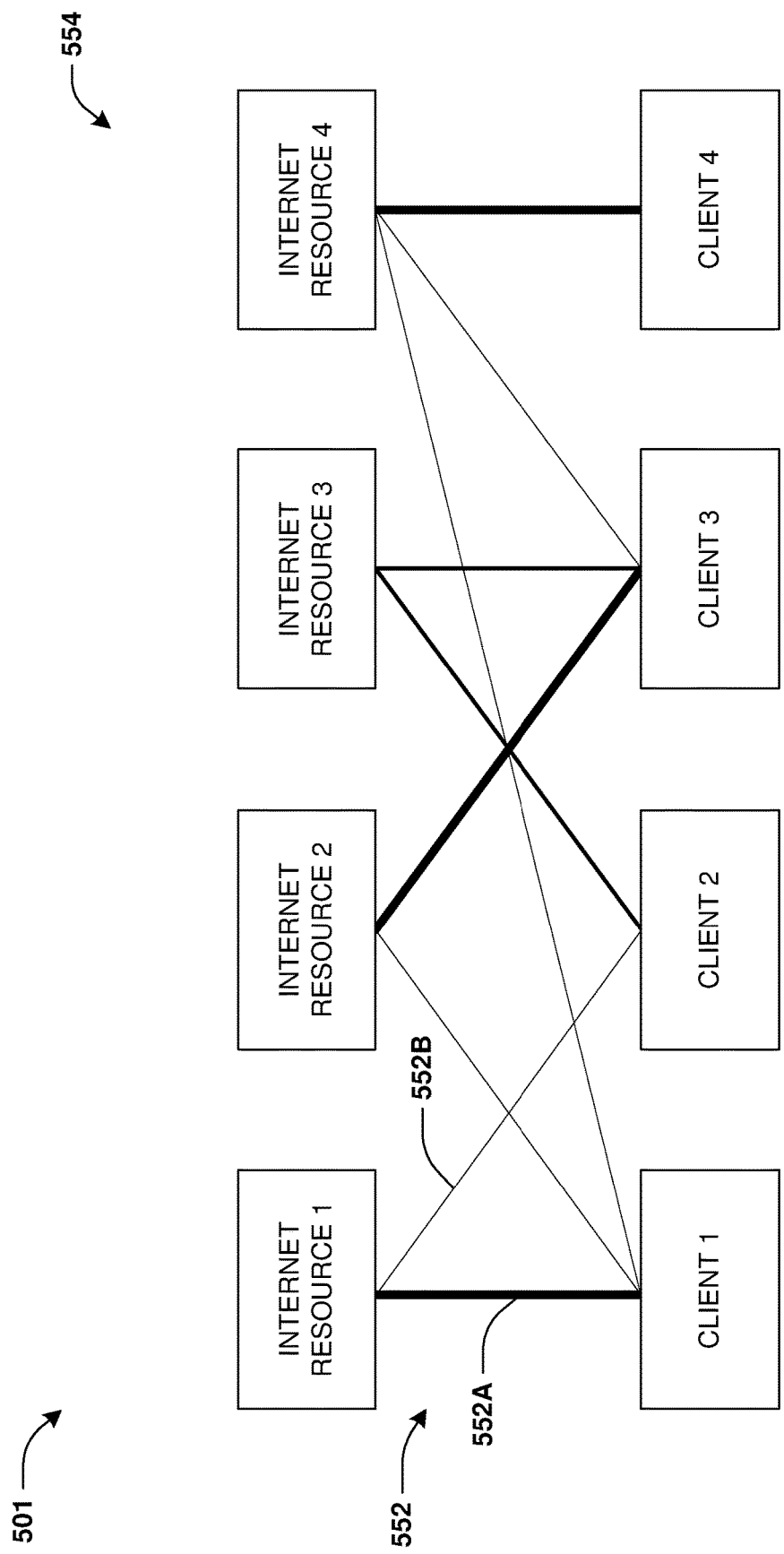
FIG. 5F is a component block diagram illustrating a representation of a first network profile generated by an example system for identifying coalition networks.

FIG. 5F illustrates a representation 554 of the first network profile. In some examples, the representation 554 may correspond to a graph, such as a bipartite graph. The representation 554 may comprise relationship lines 552. A relationship line of the relationship lines 552 may be between a client-side entity (e.g., labeled "CLIENT 1", CLIENT 2", etc. in FIG. 5F) and an internet resource-side entity (e.g., labeled "INTERNET RESOURCE 1", INTERNET RESOURCE 2", etc. in FIG. 5F). A relationship line of the relationship lines 552 between a client-side entity and an internet resource-side entity may be indicative of at least one event, of the first plurality of events, having occurred in association with the client-side entity and the internet resource-side entity. Alternatively and/or additionally, a relationship line of the relationship lines 552 between a client-side entity and an internet resource-side entity may be indicative of events (of the first plurality of events), amounting to at least the threshold quantity of events, having occurred in association with the client-side entity and the internet resource-side entity.

In some examples, a relationship line of the relationship lines 552 between a client-side entity and an internet resource-side entity may have a thickness that reflects a quantity of events having occurred in association with the client-side entity and the internet resource-side entity and/or an event rate at which events associated with the client-side entity and the internet resource-side entity occur. In an example, a first relationship line 552A of the relationship lines 552 may be between an internet resource-side entity "INTERNET RESOURCE 1" and a client-side entity "CLIENT 1". A second relationship line 552B of the relationship lines 552 may be between the internet resource-side entity "INTERNET RESOURCE 1" and a client side entity "CLIENT 2". A thickness of the first relationship line 552A may be greater than a thickness of the second relationship line 552B. Accordingly, a quantity of events having occurred in association with the internet resource-side entity "INTERNET RESOURCE 1" and the client-side entity "CLIENT 1" may be greater than a quantity of events having occurred in association with the internet resource-side entity "INTERNET RESOURCE 1" and the client-side entity "CLIENT 2". Alternatively and/or additionally, an event rate at which events associated with the internet resource-side entity "INTERNET RESOURCE 1" and the client-side entity "CLIENT 1" occur may be greater than an event rate at which events associated with the internet resource-side entity "INTERNET RESOURCE 1" and the client-side entity "CLIENT 2" occur.

In some examples, the first network profile may be indicative of event metrics associated with entities of the third plurality of entities, such as a rate at which events associated with an advertising-side entity and a client-side entity occur, a quantity of events associated with an advertising-side entity and a client-side entity, a rate at which events associated with an advertising-side entity and an internet resource-side entity occur and/or a quantity of events associated with an advertising-side entity and an internet resource-side entity.

In some examples, the first network profile is indicative of one or more second sets of event metrics associated with the first entity and one or more second entities comprising the third entity. For example, the one or more second entities may correspond to one or more advertising-side entities of the third plurality of entities.

In some examples, a second set of event metrics of the one or more second sets of event metrics may correspond to a measure of events associated with the first entity and the third entity. The events associated with the first entity and the third entity may comprise the first event. Alternatively and/or additionally, an event associated with the first entity and the third entity may be associated with a presentation of a content item (e.g., an advertisement), associated with the third entity, via the first client device 500 (e.g., the content item may correspond to the first content item 546 and/or a different content item associated with the third entity). Alternatively and/or additionally, an event associated with the first entity and the third entity may be associated with a presentation of a threshold proportion of a content item (e.g., an advertisement), associated with the third entity, via the first client device 500. Alternatively and/or additionally, an event associated with the first entity and the third entity may be associated with a selection of a content item (e.g., an advertisement), associated with the third entity, via the first client device 500. Alternatively and/or additionally, an event associated with the first entity and the second entity may correspond to a conversion event, associated with the third entity, performed by the first client device 500.

The second set of event metrics may be indicative of a second event rate at which events associated with the first entity and the third entity occur, such as during the first period of time. In an example, the second event rate may correspond to a quantity of events associated with the first entity and the third entity per unit of time (e.g., per day, per week and/or per a different unit of time). Alternatively and/or additionally, the second set of event metrics may be indicative of a second quantity of events associated with the first entity and the third entity, such as during the first period of time.

In some examples, the first network profile is indicative of one or more third sets of event metrics associated with the second entity and one or more third entities comprising the third entity. For example, the one or more third entities may correspond to one or more advertising-side entities of the third plurality of entities.

In some examples, a third set of event metrics of the one or more third sets of event metrics may correspond to a measure of events associated with the second entity and the third entity. The events associated with the second entity and the third entity may comprise the first event. Alternatively and/or additionally, an event associated with the second entity and the third entity may be associated with a presentation of a content item (e.g., an advertisement), associated with the third entity, via an internet resource associated with the second entity. Alternatively and/or additionally, an event associated with the second entity and the third entity may be associated with a presentation of a threshold proportion of a content item (e.g., an advertisement), associated with the third entity, via an internet resource associated with the second entity. Alternatively and/or additionally, an event associated with the second entity and the third entity may be associated with a selection of a content item (e.g., an advertisement), associated with the third entity, via an internet resource associated with the second entity. Alternatively and/or additionally, an event associated with the second entity and the third entity may correspond to a conversion event associated with presentation of a content item (e.g., an advertisement), associated with the third entity, via an internet resource associated with the second entity.

The third set of event metrics may be indicative of a third event rate at which events associated with the second entity and the third entity occur, such as during the first period of time. In an example, the third event rate may correspond to a quantity of events associated with the second entity and the third entity per unit of time (e.g., per day, per week and/or per a different unit of time). Alternatively and/or additionally, the third set of event metrics may be indicative of a third quantity of events associated with the second entity and the third entity, such as during the first period of time.

At 406, a first plurality of representations associated with the first plurality of entities may be generated. In some examples, the first plurality of representations may be generated based upon the first network profile and/or the first plurality of sets of event information. A representation of the first plurality of representations (and/or each representation of the first plurality of representations) may be associated with an entity of the first plurality of entities. For example, a first representation of the first plurality of representations may be associated with the first entity. In some examples, the first representation may be generated based upon the one or more first sets of event metrics, of the first network profile, associated with the first entity and the one or more first entities of the second plurality of entities. Alternatively and/or additionally, the first representation may be generated based upon the one or more second sets of event metrics, of the first network profile, associated with the first entity and the one or more second entities of the third plurality of entities. For example, the first representation may be generated based upon the one or more first sets of event metrics and/or the one or more second sets of event metrics.

In some examples, the first plurality of representations may comprise vector representations. For example, the first representation of the first plurality of representations may be a first vector representation. In some examples, the first vector representation may comprise an embedding, such as a word2vec embedding and/or a different type of embedding, generated based upon the one or more first sets of event metrics (and/or the one or more second sets of event metrics) using one or more word2vec techniques and/or one or more machine learning techniques. In some examples, the word2vec embedding may be a numerical representation (e.g., at least one of a numerical vector, a numerical embedding, etc.) of the first entity and/or the one or more first sets of event metrics (and/or the one or more second sets of event metrics) associated with the first entity.

In some examples, a vector representation generation system may use at least one of one or more dimensional reduction techniques, one or more decomposition techniques, one or more reconstruction techniques, graph solutions, etc. to perform dimensional reduction of the one or more first sets of event metrics (and/or the one or more second sets of event metrics) to generate the first vector representation associated with the first entity. For example, the one or more first sets of event metrics (and/or the one or more second sets of event metrics) may be indicative of N entities of the second plurality of entities with which the first entity performed events of the first plurality of events (e.g., the one or more first sets of event metrics and/or the one or more second sets of event metrics may comprise N sets of event metrics, where each set of event metrics of the N sets of event metrics is associated with an entity of the N entities). As a result of performing dimensional reduction of the one or more first sets of event metrics, the first vector representation may be generated having M dimensions, where the quantity M of the M dimensions is less than the quantity N of the N entities. In an example, the quantity M may be 100 and the first vector representation may correspond to a 100-dimension numerical feature vector. Other values of the quantity M are within the scope of the present disclosure. Parameters of the vector representation generation system may be adjusted and/or tuned for generating the first vector representation having varying quantities of dimensions.

At 408, a second plurality of representations associated with the second plurality of entities may be generated. In some examples, the second plurality of representations may be generated based upon the first network profile and/or the first plurality of sets of event information. A representation of the second plurality of representations (and/or each representation of the second plurality of representations) may be associated with an entity of the second plurality of entities.

For example, a second representation of the second plurality of representations may be associated with the second entity. In some examples, the second representation may be generated based upon one or more fourth sets of event metrics, of the first network profile, associated with the second entity and one or more fourth entities of the first plurality of entities. The one or more fourth entities may comprise one or more entities with which the second entity performed at least one event of the first plurality of events. Alternatively and/or additionally, the one or more fourth entities may comprise one or more entities with which the second entity performed events, amounting to at least a threshold quantity of events, of the first plurality of events. In an example, the one or more fourth entities may comprise the first entity and/or one or more other entities of the first plurality of entities with which the second entity performed one or more events of the first plurality of events. In some examples, the one or more fourth sets event metrics may comprise the first set of event metrics of the one or more first sets of event metrics and/or one or more other sets of event metrics associated with the one or more other entities of the first plurality of entities.

Alternatively and/or additionally, the second representation may be generated based upon the one or more third sets of event metrics, of the first network profile, associated with the first entity and the one or more third entities of the third plurality of entities. For example, the first representation may be generated based upon the one or more fourth sets of event metrics and/or the one or more third sets of event metrics.

In some examples, the second plurality of representations may comprise vector representations. For example, the second representation of the second plurality of representations may be a second vector representation. In some examples, the second vector representation may comprise an embedding, such as a word2vec embedding and/or a different type of embedding, generated based upon the one or more fourth sets of event metrics (and/or the one or more third sets of event metrics) using one or more word2vec techniques and/or one or more machine learning techniques. In some examples, the word2vec embedding may be a numerical representation (e.g., at least one of a numerical vector, a numerical embedding, etc.) of the second entity and/or the one or more fourth sets of event metrics (and/or the one or more third sets of event metrics) associated with the second entity.

In some examples, the vector representation generation system may perform dimensional reduction of the one or more fourth sets of event metrics (and/or the one or more third sets of event metrics) to generate the second vector representation associated with the second entity, such as using one or more of the techniques described herein with respect to generation the first vector representation.

Figure 5G:
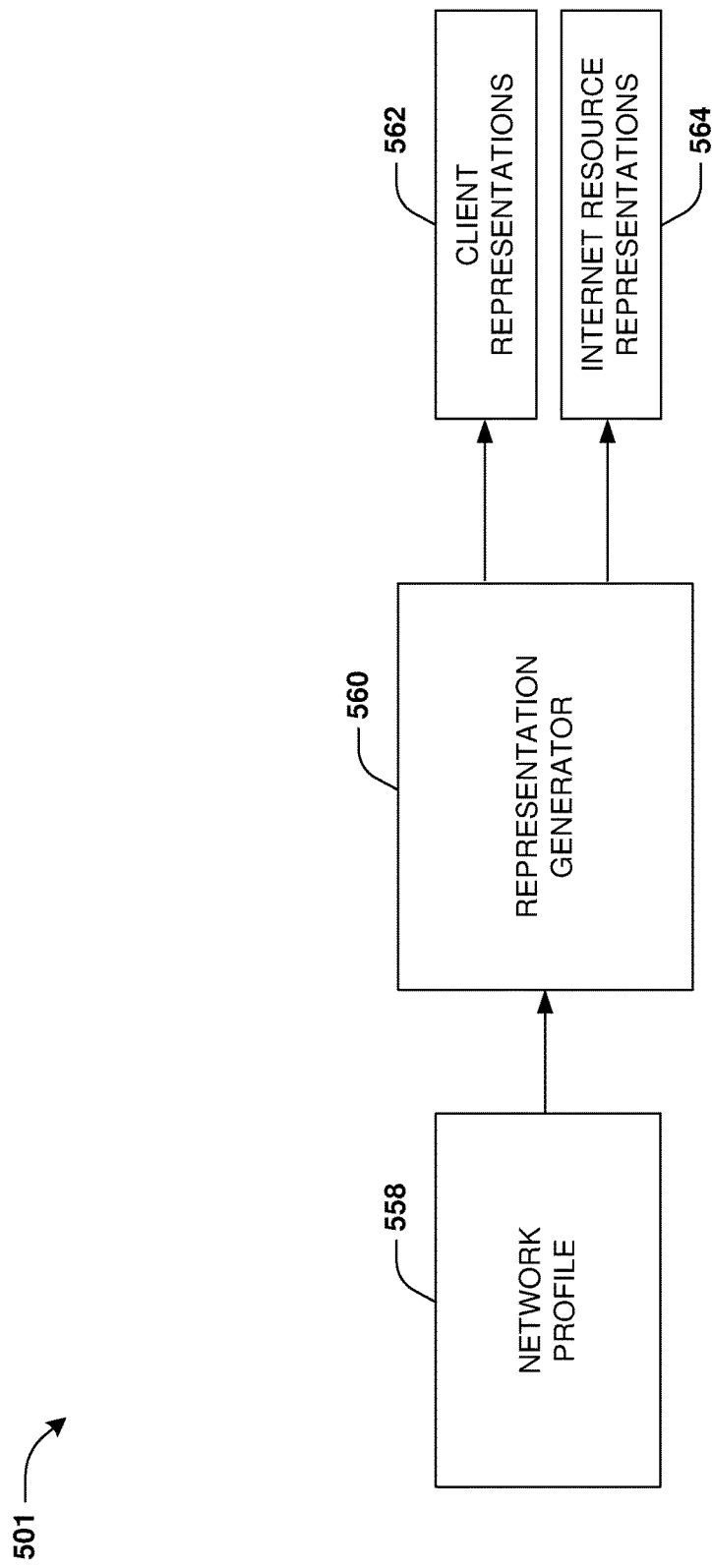
FIG. 5G is a component block diagram illustrating an example system for identifying coalition networks, where a first plurality of representations and a second plurality of representations are generated.

FIG. 5G illustrates an exemplary scenario in which the first plurality of representations (shown with reference number 562) and the second plurality of representations (shown with reference number 564) are generated. For example, the first network profile (shown with reference number 558) may be input to a representation generator 560. The representation generator 560 may comprise the vector representation generation system. The representation generator 560 may generate and/or output the first plurality of representations 562 and/or the second plurality of representations 564 based upon the first network profile 558.

At 410, a first plurality of clusters in the first plurality of representations may be identified. In some examples, a cluster of the first plurality of clusters (and/or each cluster of the first plurality of clusters) corresponds to a set of representations of the first plurality of representations. For example, a first cluster of the first plurality of clusters may correspond to a first set of representations of the first plurality of representations.

In some examples, the first set of representations may be identified as the first cluster based upon a determination that representations of the first set of representations are similar to each other. Alternatively and/or additionally, the first set of representations may be identified as the first cluster based upon a determination that differences between representations of the first set of representations are less than a threshold difference. For example, one or more operations (e.g., mathematical operations) may be performed using representations of the first set of representations to determine a difference between the representations. The difference may be compared with the threshold difference to determine whether the difference is less than the threshold difference.

Alternatively and/or additionally, the first plurality of clusters may be identified using one or more clustering techniques, such as one or more spectral clustering techniques, one or more k-means clustering techniques and/or one or more other clustering techniques. For example, the first plurality of representations may be analyzed using the one or more clustering techniques to identify the first plurality of clusters. In an example where the first plurality of representations comprises vector representations, the first set of representations may be identified as the first cluster based upon a determination that distances between representations of the first set of representations are less than a threshold distance. For example, one or more operations (e.g., mathematical operations) may be performed using representations of the first set of representations to determine a distance between the representations. The distance may be compared with the threshold distance to determine whether the distance is less than the threshold distance.

In some examples, distances between representations of the first plurality of representations may be determined, and a similarity data structure (e.g., at least one of a similarity matrix, a similarity graph, etc.) may be generated based upon the distances. Eigenvalues and/or eigenvectors associated with the similarity data structure may be determined based upon the similarity data structure. Similar representations of the first plurality of representations may be identified and/or clustered using one or more clustering techniques (e.g., one or more k-means clustering techniques) based upon the similarity data structure, the eigenvalues and/or the eigenvectors. The first set of representations of the first plurality of representations may be identified as the first cluster based upon a determination that a density associated with the first set of representations exceeds a first threshold density. In some examples, the density may be determined based upon the similarity data structure, the eigenvalues and/or the eigenvectors.

It may be appreciated that first generating the first plurality of representations, and then identifying the first plurality of clusters in the first plurality of representations, provides for an improved efficiency compared with a system that analyzes the first network profile 558 to identify clusters of entities and/or coalition networks without first generating the first plurality of representations. For example, attempting to analyze the network profile 558 to identify clusters of entities without first generating the first plurality of representations may be difficult and/or inefficient (e.g., identification of clusters of entities without first generating the first plurality of representations may be formulated as a dense subgraph detection problem and/or a biclique detection problem, which are nondeterministic polynomial time (NP)-hard problems). However, generation of the first plurality of representations simplifies solving the problem of identifying the first plurality of clusters such that the problem can be more efficiently solved.

At 412, a second plurality of clusters in the second plurality of representations may be identified. In some examples, a cluster of the second plurality of clusters (and/or each cluster of the second plurality of clusters) corresponds to a set of representations of the second plurality of representations. For example, a second cluster of the second plurality of clusters may correspond to a second set of representations of the second plurality of representations.

In some examples, the second set of representations may be identified as the second cluster based upon a determination that representations of the second set of representations are similar to each other. Alternatively and/or additionally, the second set of representations may be identified as the second cluster based upon a determination that differences between representations of the second set of representations are less than a threshold difference. For example, one or more operations (e.g., mathematical operations) may be performed using representations of the second set of representations to determine a difference between the representations. The difference may be compared with the threshold difference to determine whether the difference is less than the threshold difference.

Alternatively and/or additionally, the second plurality of clusters may be identified using one or more clustering techniques, such as one or more spectral clustering techniques, one or more k-means clustering techniques and/or one or more other clustering techniques. For example, the second plurality of representations may be analyzed using the one or more clustering techniques to identify the second plurality of clusters. In an example where the second plurality of representations comprises vector representations, the second set of representations may be identified as the second cluster based upon a determination that distances between representations of the second set of representations are less than a threshold distance. For example, one or more operations (e.g., mathematical operations) may be performed using representations of the second set of representations to determine a distance between the representations. The distance may be compared with the threshold distance to determine whether the distance is less than the threshold distance.

In some examples, distances between representations of the second plurality of representations may be determined, and a similarity data structure (e.g., at least one of a similarity matrix, a similarity graph, etc.) may be generated based upon the distances. Eigenvalues and/or eigenvectors associated with the similarity data structure may be determined based upon the similarity data structure. Similar representations of the second plurality of representations may be identified and/or clustered using one or more clustering techniques (e.g., one or more k-means clustering techniques) based upon the similarity data structure, the eigenvalues and/or the eigenvectors. The second set of representations of the second plurality of representations may be identified as the second cluster based upon a determination that a density associated with the second set of representations exceeds a second threshold density. In some examples, the density may be determined based upon the similarity data structure, the eigenvalues and/or the eigenvectors.

At 414, the first network profile may be analyzed to determine that a first set of entities associated with the first cluster and a second set of entities associated with the second cluster are related. In some examples, the first set of entities may be associated with the first set of representations corresponding to the first cluster. Alternatively and/or additionally, the second set of entities may be associated with the second set of representations corresponding to the second cluster.

In some examples, the determination that the first set of entities and the second set of entities are related is based upon a determination that one or more first events of the first plurality of events are associated with the first set of entities and the second set of entities. For example, each event of the one or more first events may be performed by an entity of the first set of entities and an entity of the second set of entities. In an example, an event of the one or more first events may correspond to a presentation of a content item via a client device associated with an entity of the first set of entities (corresponding to the first cluster) using an internet resource associated with an entity of the second set of entities (corresponding to the second cluster). Alternatively and/or additionally, an event of the one or more first events may correspond to a presentation of a threshold proportion of a content item via a client device associated with an entity of the first set of entities (corresponding to the first cluster) using an internet resource associated with an entity of the second set of entities (corresponding to the second cluster). Alternatively and/or additionally, an event of the one or more first events may correspond to a selection of a content item via a client device associated with an entity of the first set of entities (corresponding to the first cluster) using an internet resource associated with an entity of the second set of entities (corresponding to the second cluster). Alternatively and/or additionally, an event of the one or more first events may correspond to a conversion event associated with a presentation of a content item via a client device associated with an entity of the first set of entities (corresponding to the first cluster) using an internet resource associated with an entity of the second set of entities (corresponding to the second cluster).

In some examples, the first network profile may be analyzed based upon the first set of entities and the second set of entities to determine a fourth quantity of events associated with the first set of entities and the second set of entities (e.g., the fourth quantity of events may correspond to a quantity of events of the one or more first events). In some examples, the determination that the first set of entities and the second set of entities are related is based upon a determination that the fourth quantity of events exceeds a threshold quantity of events.

In some examples, the first network profile may be analyzed based upon the one or more first events, the first set of entities and/or the second set of entities to determine a first quantity of entities associated with the one or more first events. In an example, it may be determined that the one or more first events are associated with one or more fifth entities of the first set of entities and one or more sixth entities of the second set of entities. The first quantity of entities associated with the one or more first events may be determined based upon the one or more fifth entities and/or the one or more sixth entities (e.g., the first quantity of entities may be determined based upon a quantity of entities of the one or more fifth entities and/or a quantity of entities of the one or more sixth entities). In some examples, the determination that the first set of entities and the second set of entities are related is based upon a determination that the first quantity of entities exceeds a threshold quantity of entities. Alternatively and/or additionally, the determination that the first set of entities and the second set of entities are related may be based upon a determination that the first quantity of entities exceeds a threshold proportion of the first set of entities and/or the second set of entities.

At 416, a first coalition network associated with fraudulent activity may be determined based upon the determination that the first set of entities and the second set of entities are related. For example, the first set of entities and the second set of entities may be identified and/or recognized as being a network of entities used for performing fraudulent activity based upon the determination that the first set of entities and the second set of entities are related. In some examples, the first coalition network may correspond to a network of entities, comprising at least some of the first set of entities and at least some of the second set of entities, used to perform fraudulent activity, such as advertising fraud. In some examples, the first coalition network may comprise all the first set of entities and/or all of the second set of entities. Alternatively and/or additionally, the first coalition network may comprise a subset of the first set of entities and/or a subset of the second set of entities. In some examples, merely entities of the first set of entities that are related to entities of the second set of entities may be included in the first coalition network. Alternatively and/or additionally, merely entities of the second set of entities that are related to entities of the first set of entities may be included in the first coalition network. For example, merely entities, of the first set of entities and the second set of entities, that are associated with the one or more first events, may be included in the first coalition network.

In some examples, one or more other coalition networks associated with fraudulent activity may be determined, such as using one or more of the techniques described herein with respect to identifying the first coalition network. For example, analysis of the first network profile may be performed (iteratively, for example), using one or more of the techniques described herein, for each cluster of the first plurality of clusters and/or each cluster of the second plurality of clusters to determine whether entities associated with a cluster of the first plurality of clusters are related to entities associated with a cluster of the second plurality of clusters. A coalition network may be identified based upon a determination that entities associated with a cluster of the first plurality of clusters are related to entities associated with a cluster of the second plurality of clusters.

Figure 5H:
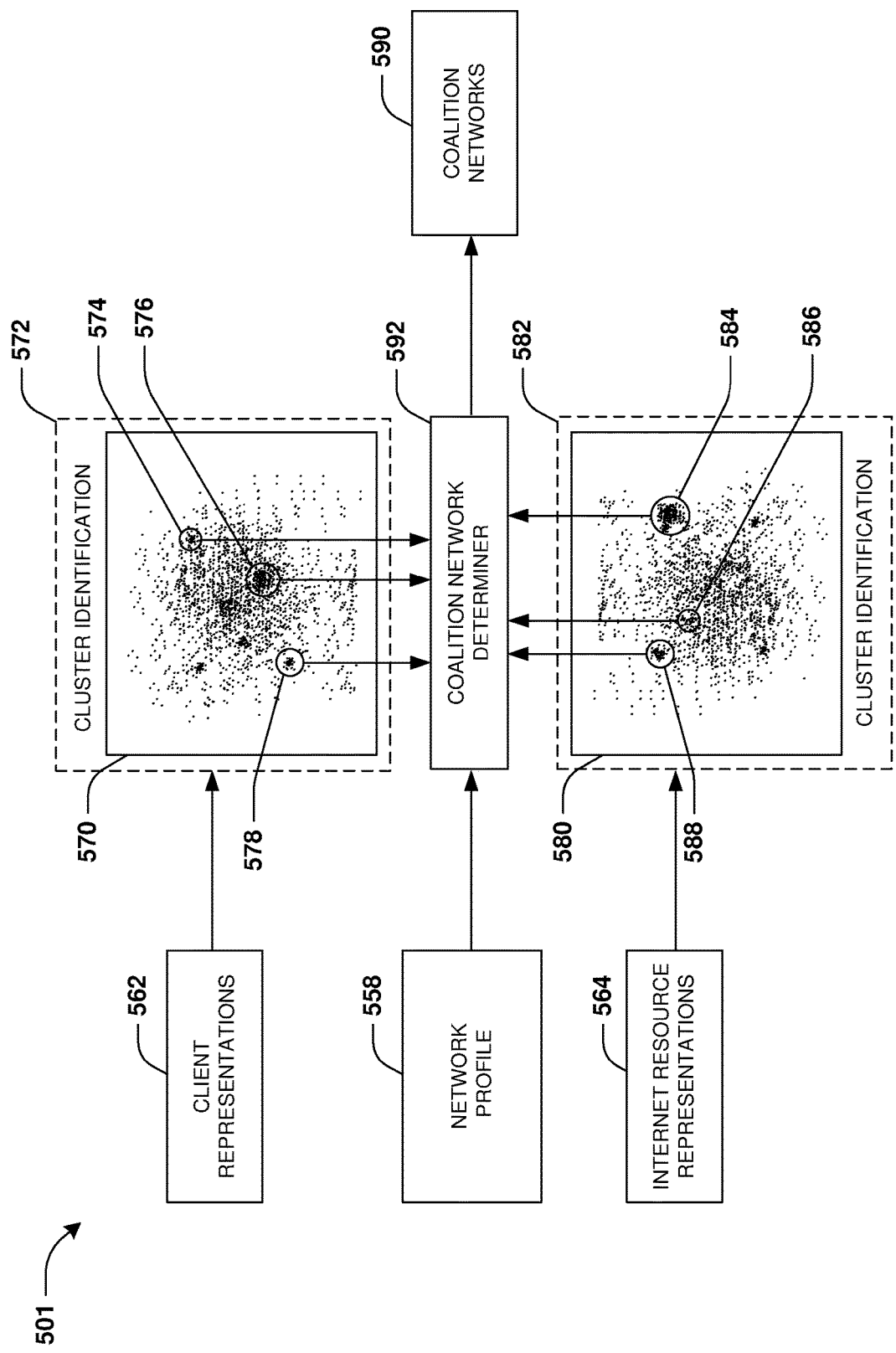
FIG. 5H is a component block diagram illustrating an example system for identifying coalition networks, where one or more coalition networks are identified based upon a first plurality of representations and a second plurality of representations.

FIG. 5H illustrates an exemplary scenario in which one or more coalition networks 590 are identified based upon the first plurality of representations (shown with reference number 562) and the second plurality of representations (shown with reference number 564). In some examples, one or more first cluster identification operations 572 may be performed using the first plurality of representations 562 to identify the first plurality of clusters in a first embedding space 570. For example, the first plurality of clusters may comprise the first cluster (shown with reference number 576), a third cluster 574 and/or a fourth cluster 578.

In some examples, one or more second cluster identification operations 582 may be performed using the second plurality of representations 564 to identify the second plurality of clusters in a second embedding space 580. For example, the second plurality of clusters may comprise the second cluster (shown with reference number 584), a fifth cluster 586 and/or a sixth cluster 588.

In some examples, the first network profile (shown with reference number 558), information associated with the first plurality of clusters and/or information associated with the second plurality of clusters may be input to a coalition network determiner 592. In some examples, for each cluster of the first plurality of clusters and/or the second plurality of clusters, the first network profile 558 may be analyzed to determine whether entities associated with a cluster of the first plurality of clusters are related to entities associated with a cluster of the second plurality of clusters. A coalition network of the one or more coalition networks 590 may be identified based upon a determination that entities associated with a cluster of the first plurality of clusters are related to entities associated with a cluster of the second plurality of clusters.

It may be appreciated that first identifying the first plurality of clusters and the second plurality of clusters, then analyzing the first network profile 558 to identify the one or more coalition networks 590 based upon the first plurality of clusters and the second plurality of clusters, provides for a reduced target cardinality and an improved efficiency compared with a system that analyzes the first network profile 558 to identify coalition networks without first identifying the first plurality of clusters and the second plurality of clusters. For example, attempting to analyze the network profile 558, the first plurality of representations 562 and/or the second plurality of representations 564 to identify coalition networks without first identifying the first plurality of clusters and/or the second plurality of clusters may be difficult and/or inefficient (e.g., identification of coalition networks without first identifying the first plurality of clusters and/or the second plurality of clusters may be an NP-hard problem). However, identification of the first plurality of clusters and the second plurality of clusters, and using the first plurality of clusters and the second plurality of clusters for identifying coalition networks simplifies solving the problem of identifying the coalition networks such that the problem can be more efficiently solved.

In some examples, rather than (and/or in addition to) analyzing the first plurality of representations and the second plurality of representations separately to identify the first plurality of clusters and the second plurality of clusters, a third plurality of representations, comprising the first plurality of representations and the second plurality of representations, may be analyzed to identify a third plurality of clusters. For example, a third cluster of the third plurality of clusters may correspond to a third set of representations comprising one or more representations of the first plurality of representations (associated with client-side entities) and/or one or more representations of the second plurality of representations (associated with internet resource-side entities).

In some examples, the third set of representations may be identified as the third cluster based upon a determination that representations of the third set of representations are similar to each other. Alternatively and/or additionally, the third set of representations may be identified as the third cluster based upon a determination that differences between representations of the third set of representations are less than a threshold difference. For example, one or more operations (e.g., mathematical operations) may be performed using representations of the third set of representations to determine a difference between the representations. The difference may be compared with the threshold difference to determine whether the difference is less than the threshold difference.

Alternatively and/or additionally, the third plurality of clusters may be identified using one or more clustering techniques, such as one or more spectral clustering techniques, one or more k-means clustering techniques and/or one or more other clustering techniques. For example, the third plurality of representations may be analyzed using the one or more clustering techniques to identify the third plurality of clusters. In an example where the third plurality of representations comprises vector representations, the third set of representations may be identified as the third cluster based upon a determination that distances between representations of the third set of representations are less than a threshold distance. For example, one or more operations (e.g., mathematical operations) may be performed using representations of the third set of representations to determine a distance between the representations. The distance may be compared with the threshold distance to determine whether the distance is less than the threshold distance.

In some examples, distances between representations of the third plurality of representations may be determined, and a similarity data structure (e.g., at least one of a similarity matrix, a similarity graph, etc.) may be generated based upon the distances. Eigenvalues and/or eigenvectors associated with the similarity data structure may be determined based upon the similarity data structure. Similar representations of the third plurality of representations may be identified and/or clustered using one or more clustering techniques (e.g., one or more k-means clustering techniques) based upon the similarity data structure, the eigenvalues and/or the eigenvectors. The third set of representations of the third plurality of representations may be included in the third cluster based upon a determination that a density associated with the third set of representations exceeds a third threshold density. In some examples, the density may be determined based upon the similarity data structure, the eigenvalues and/or the eigenvectors.

In some examples, one or more coalition networks may be identified based upon the third plurality of clusters. In an example, a third coalition network may be identified based upon a third set of entities associated with the third set of representations corresponding to the third cluster. For example, the third set of entities may be identified and/or recognized as being a network of entities used for performing fraudulent activity based upon the determination that the third set of entities are associated with the third set of representations corresponding to the third cluster.

Figure 6:
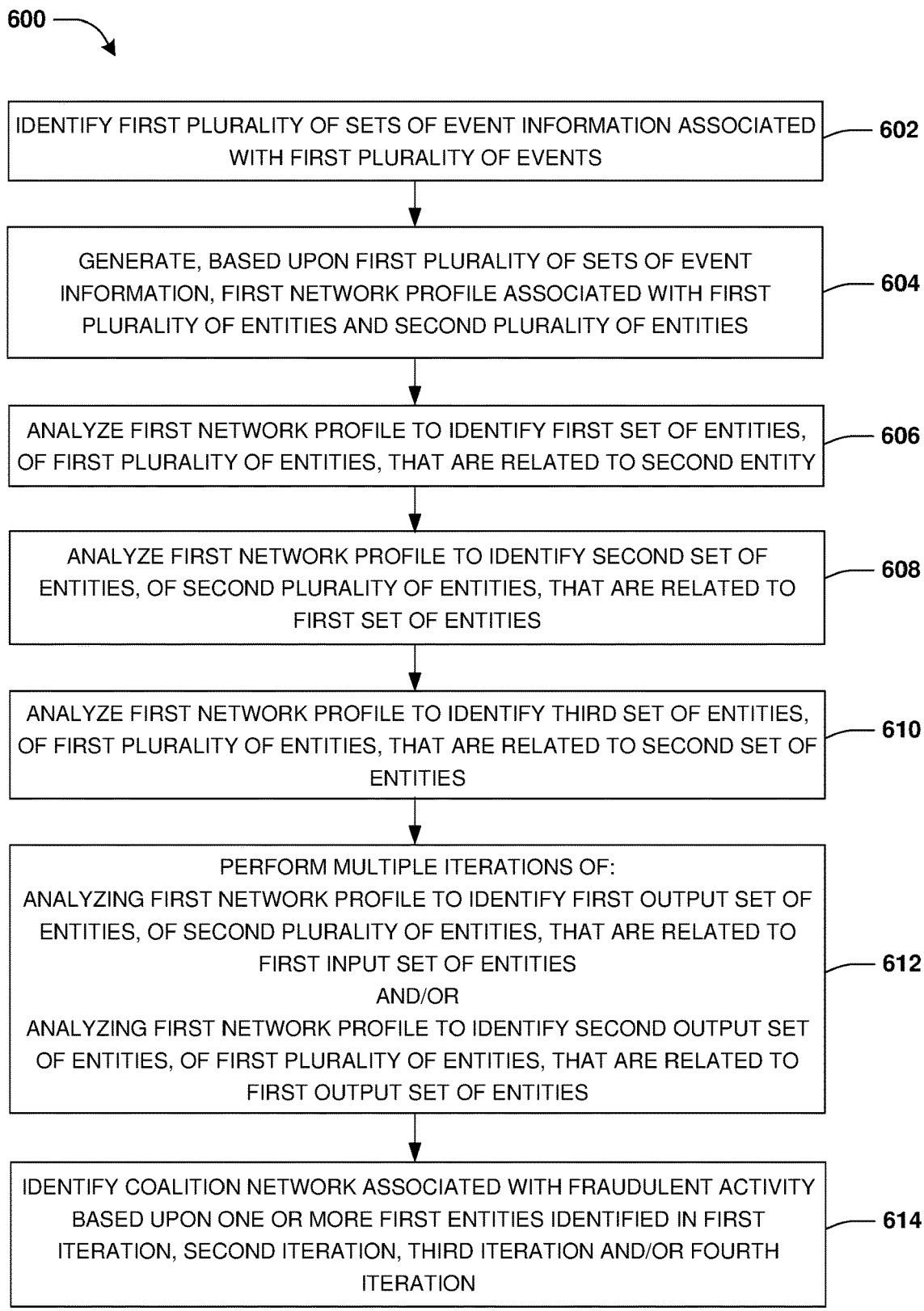
FIG. 6 is a flow chart illustrating an example method for identifying coalition networks.

An embodiment of identifying coalition networks is illustrated by an example method 600 of FIG. 6. A content system for providing content items via client devices, such as the content system described with respect to the method 400 of FIG. 4, may be provided. At 602, a first plurality of sets of event information associated with a first plurality of events may be identified. The first plurality of events may be associated with a first plurality of entities corresponding to a first entity type and a second plurality of entities corresponding to a second entity type. In some examples, the first plurality of events may correspond to events that occur within a first period of time.

In some examples, the first plurality of entities corresponds to client-side (and/or user-side) entities. For example, an entity of the first plurality of entities may be associated with a client device. The first type of entity may correspond to at least one of a client device, a device identifier associated with a device, an IP address associated with a device, a carrier identifier indicative of carrier information associated with a device, a user identifier (e.g., at least one of a username, an email address, a user account identifier, etc.) associated with a device, a browser cookie, etc.

In some examples, the second plurality of entities corresponds to internet resource-side (and/or publisher-side) entities. For example, an entity of the second plurality of entities may be associated with an internet resource, such as at least one of a web page, a website, an application (e.g., a client application, a mobile application, a platform, etc.). The second type of entity may correspond to at least one of an internet resource, an internet resource identifier associated with an internet resource, a host device associated with an internet resource (e.g., the host device may comprise one or more computing devices, storage and/or a network configured to host the internet resource), a host identifier of the host device, a domain (e.g., a domain name, a top-level domain, etc.) associated with an internet resource, an application identifier associated with an application, a publisher identifier associated with a publisher of an internet resource, etc.

In some examples, an event of the first plurality of events (and/or each event of the first plurality of events) may correspond to activity performed by an entity of the first plurality of entities and/or an entity of the second plurality of entities. In an example, an event of the first plurality of events (and/or each event of the first plurality of events) may correspond to presentation of a content item (e.g., presentation of an advertisement and/or an advertisement impression), a selection of the content item (e.g., an advertisement click), and/or a conversion event associated with the content item, where the content item may be provided by the content system.

A first set of event information of the first plurality of sets of event information may be associated with a first event of the first plurality of events. The first set of event information may be indicative of a first entity (e.g., a client-side entity), of the first plurality of entities, associated with the first event. The first set of event information may be indicative of a second entity (e.g., an internet resource-side entity), of the second plurality of entities, associated with the first event. Examples of the first event are illustrated in FIGS. 5A-5E and described in the foregoing description of FIGS. 5A-5E. In some examples, the first entity may be associated with a first client device (such as the first client device 500 illustrated in FIGS. 5A-5E) and/or the second entity may be associated with one or more first internet resources (such as the one or more first internet resources comprising the fourth web page 544 illustrated in FIG. 5E).

In some examples, the first event may correspond to a presentation of a content item via the first client device using an internet resource of the one or more first internet resources. Alternatively and/or additionally, the first event may correspond to a presentation of a threshold proportion of a content item via the first client device using an internet resource of the one or more first internet resources. Alternatively and/or additionally, the first event may correspond to a selection of a content item via the first client device using an internet resource of the one or more first internet resources. Alternatively and/or additionally, the first event may correspond to a conversion event (such as described in the foregoing description) associated with a content item that is presented via the first client device using an internet resource of the one or more first internet resources.

In some examples, the first plurality of sets of event information may comprise indications of a third plurality of entities corresponding to a third entity type (e.g., advertising-side entities), such as described with respect to the method 400 of FIG. 4, where a set of event information of the first plurality of sets of event information comprises an indication of an entity of the first plurality of entities associated with an event, an indication of an entity of the second plurality of entities associated with the event and/or an indication of an entity of the third plurality of entities associated with the event.

At 604, a first network profile associated with the first plurality of entities and/or the second plurality of entities may be generated based upon the first plurality of sets of event information. In some examples, the first network profile may be indicative of event metrics associated with entities of the first plurality of entities and/or the second plurality of entities, such as a rate at which events associated with a client-side entity and an internet resource-side entity occur, and/or a quantity of events associated with a client-side entity and an internet resource-side entity.

In some examples, the first network profile is indicative of one or more first sets of event metrics associated with the second entity and a first set of entities comprising the second entity. For example, the first set of entities may correspond to one or more client-side entities of the first plurality of entities.

In some examples, a first set of event metrics of the one or more first sets of event metrics may correspond to a measure of events associated with the first entity and the second entity, such as described with respect to the method 400 of FIG. 4.

In some examples, the first set of entities associated with the one or more first sets of event metrics may comprise entities, of the first plurality of entities, with which the second entity performed at least one event of the first plurality of events. For example, the first plurality of sets of event information may be analyzed based upon the second entity to identify the first set of entities with which the second entity performed at least one event of the first plurality of events.

Alternatively and/or additionally, the first set of entities associated with the one or more first sets of event metrics may comprise entities, of the first plurality of entities, with which the second entity performed events, amounting to at least a threshold quantity of events, of the first plurality of events. For example, the first plurality of sets of event information may be analyzed based upon the second entity and the threshold quantity of events to identify the first set of entities with which the second entity performed events, amounting to at least the threshold quantity events, of the first plurality of events.

For each entity of the first set of entities, a set of event metrics associated with the second entity and the entity may be determined (based upon the first plurality of sets of event information) and included in the first network profile.

The first network profile may be represented by a graph (e.g., a bipartite graph), such as the representation 554 illustrated in FIG. 5F and described with respect to the method 400 of FIG. 4.

In some examples, the first network profile may be indicative of event metrics associated with entities of the third plurality of entities, such as a rate at which events associated with an advertising-side entity and a client-side entity occur, a quantity of events associated with an advertising-side entity and a client-side entity, a rate at which events associated with an advertising-side entity and an internet resource-side entity occur and/or a quantity of events associated with an advertising-side entity and an internet resource-side entity.

In some examples, a first iterative process may be performed to identify one or more coalition networks associated with fraudulent activity from amongst the first plurality of entities and/or the second plurality of entities. The first iterative process is described with respect to acts 606-612 of the method 600.

At 606, the first network profile may be analyzed to identify the first set of entities, of the first plurality of entities, that are related to the second entity. In some examples, the identification of the first set of entities that are related to the second entity is performed based upon a determination that each entity of the first set of entities is associated with one or more events, of the first plurality of events, associated with the second entity. For example, the first entity of the first plurality of entities may be included in the first set of entities based upon a determination that one or more events of the first plurality of events are performed by the first entity and the second entity.

Alternatively and/or additionally, the identification of the first set of entities that are related to the second entity may be performed based upon a determination that each entity of the first set of entities is associated with one or more events, exceeding a first threshold quantity of events, associated with the second entity. For example, the first entity of the first plurality of entities may be included in the first set of entities based upon a determination that one or more events of the first plurality of events are performed by the first entity and the second entity and/or that the one or more events exceed the first threshold quantity of events.

Figure 7A:
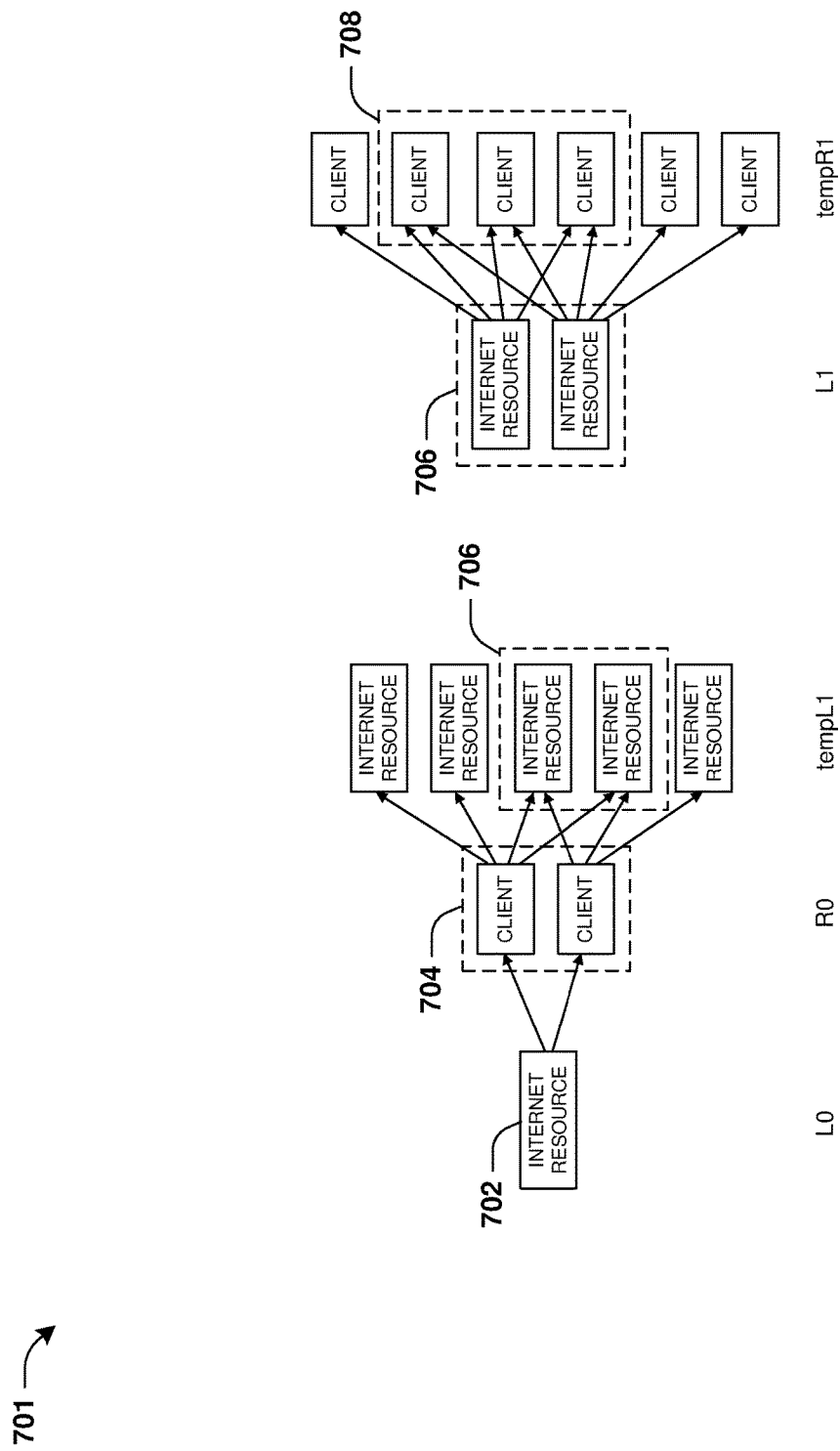
FIG. 7A is a component block diagram illustrating an example system for performing an iterative process for identifying a coalition network, where some of the iterative process is performed.
Figure 7B:
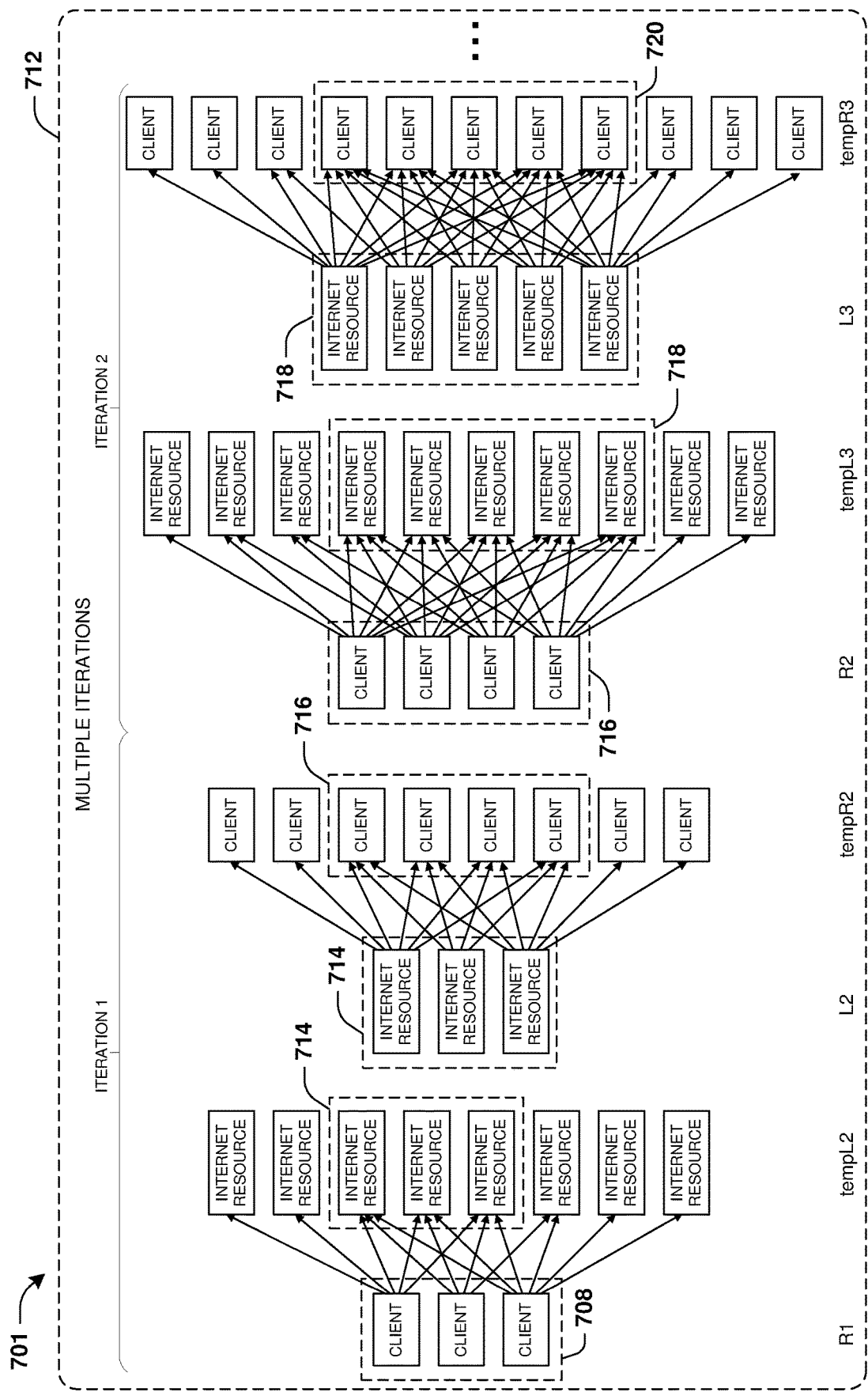
FIG. 7B is a component block diagram illustrating an example system for identifying coalition networks, where two iterations of multiple iterations of the iterative process are performed.

FIGS. 7A-7B illustrate examples of a system 701 for performing the first iterative process, described with respect to the method 600 of FIG. 6. FIG. 7A illustrates performance of some of the first iterative process. For example, the first network profile may be analyzed to identify a first set of entities (shown with reference number 704) that are related to the second entity (shown with reference number 702).

At 608, the first network profile may be analyzed to identify a second set of entities, of the second plurality of entities, that are related to the first set of entities.

In some examples, the identification of the second set of entities that are related to the first set of entities is performed based upon a determination that each entity of the second set of entities is associated with one or more events of the first plurality of events, where the one or more events comprise at least one event associated with each entity of the first set of entities. For example, a third entity may be included in the second set of entities based upon a determination that each entity of the first set of entities performed at least one event of the first plurality of events with the third entity.

Alternatively and/or additionally, the identification of the second set of entities that are related to the first set of entities may be performed based upon a determination that each entity of the second set of entities is associated with events of the first plurality of events, where the events comprise one or more events, amounting to at least a second threshold quantity of events, associated with each entity of the first set of entities. For example, the third entity may be included in the second set of entities based upon a determination that each entity of the first set of entities performed one or more events, amounting to at least the second threshold quantity of events, with the third entity.

Alternatively and/or additionally, the identification of the second set of entities that are related to the first set of entities may be performed based upon a determination that each entity of the second set of entities is associated with one or more events of the first plurality of events, where the one or more events comprise at least one event associated with each entity of a first threshold proportion of the first set of entities. For example, the third entity may be included in the second set of entities based upon a determination that each entity of one or more entities of the first set of entities performed at least one event of the first plurality of events with the third entity, where the one or more entities make up at least the first threshold proportion of the first set of entities. In an example where the first threshold proportion corresponds to 80% and the first set of entities has 10 entities, the third entity may be included in the second set of entities based upon a determination that the one or more entities, with which the third entity performed at least one event of the first plurality of events, corresponds to at least 8 entities (e.g., 80% of the 10 entities of the first set of entities).

Alternatively and/or additionally, the identification of the second set of entities that are related to the first set of entities may be performed based upon a determination that each entity of the second set of entities is associated with events of the first plurality of events, where the events comprise one or more events, amounting to at least the second threshold quantity of events, associated with each entity of the first threshold proportion of the first set of entities. For example, the third entity may be included in the second set of entities based upon a determination that each entity of one or more entities of the first set of entities performed one or more events, amounting to at least the second threshold quantity of events, with the third entity, where the one or more entities make up at least the first threshold proportion of the first set of entities.

With respect to FIG. 7A, the first network profile may be analyzed to identify the second set of entities (shown with reference number 706) that are related to the first set of entities 704. For example, a plurality of entities (shown in column "tempL1" of FIG. 7A) may be identified, where each entity of the plurality of entities performed at least one event with at least one entity of the first set of entities 704. The second set of entities 706 may be selected from the plurality of entities based upon a determination that each entity of the second set of entities 706 performed one or more events, of the first plurality of events, with each entity of the first set of entities 704. Alternatively and/or additionally, the second set of entities 706 may be selected from the plurality of entities based upon a determination that each entity of the second set of entities 706 performed one or more events, of the first plurality of events, with each entity of one or more entities of the first set of entities 704, where the one or more entities make up at least the first threshold proportion of the first set of entities 706.

At 610, the first network profile may be analyzed to identify a third set of entities, of the first plurality of entities, that are related to the second set of entities.

In some examples, the identification of the third set of entities that are related to the second set of entities is performed based upon a determination that each entity of the third set of entities is associated with one or more events of the first plurality of events, where the one or more events comprise at least one event associated with each entity of the second set of entities. For example, a fourth entity may be included in the third set of entities based upon a determination that each entity of the second set of entities performed at least one event of the first plurality of events with the fourth entity.

Alternatively and/or additionally, the identification of the third set of entities that are related to the second set of entities may be performed based upon a determination that each entity of the third set of entities is associated with events of the first plurality of events, where the events comprise one or more events, amounting to at least a third threshold quantity of events, associated with each entity of the second set of entities. For example, the fourth entity may be included in the third set of entities based upon a determination that each entity of the second set of entities performed one or more events, amounting to at least the third threshold quantity of events, with the fourth entity.

Alternatively and/or additionally, the identification of the third set of entities that are related to the second set of entities may be performed based upon a determination that each entity of the third set of entities is associated with one or more events of the first plurality of events, where the one or more events comprise at least one event associated with each entity of a second threshold proportion of the second set of entities. For example, the fourth entity may be included in the third set of entities based upon a determination that each entity of one or more entities of the second set of entities performed at least one event of the first plurality of events with the fourth entity, where the one or more entities make up at least the second threshold proportion of the second set of entities.

Alternatively and/or additionally, the identification of the third set of entities that are related to the second set of entities may be performed based upon a determination that each entity of the third set of entities is associated with events of the first plurality of events, where the events comprise one or more events, amounting to at least the third threshold quantity of events, associated with each entity of the second threshold proportion of the second set of entities.

For example, the fourth entity may be included in the third set of entities based upon a determination that each entity of one or more entities of the second set of entities performed one or more events, amounting to at least the third threshold quantity of events, with the fourth entity, where the one or more entities make up at least the second threshold proportion of the second set of entities.

With respect to FIG. 7A, the first network profile may be analyzed to identify the third set of entities (shown with reference number 708) that are related to the second set of entities 706. For example, a plurality of entities (shown in column "tempR1" of FIG. 7A) may be identified, where each entity of the plurality of entities performed at least one event with at least one entity of the second set of entities 706. The third set of entities 708 may be selected from the plurality of entities based upon a determination that each entity of the third set of entities 708 performed one or more events, of the first plurality of events, with each entity of the second set of entities 706. Alternatively and/or additionally, the third set of entities 708 may be selected from the plurality of entities based upon a determination that each entity of the third set of entities 708 performed one or more events, of the first plurality of events, with each entity of one or more entities of the second set of entities 706, where the one or more entities make up at least the first threshold proportion of the second set of entities 706.

At 612, multiple iterations may be performed. An iteration of the multiple iterations may comprise at least one part of two parts. A first part of the two parts comprises analyzing the first network profile to identify a first output set of entities, of the second plurality of entities, that are related to a first input set of entities. A second part of the two parts comprises analyzing the first network profile to identify a second output set of entities, of the first plurality of entities, that are related to the first output set of entities.

In some examples, for an initial iteration of the multiple iterations, the first input set of entities corresponds to the third set of entities. For an iteration, of the multiple iterations, following the initial iteration, the first input set of entities corresponds to the second output set of entities identified in a preceding iteration of the multiple iterations. For example, for a second iteration of the multiple iterations that follows (e.g., directly follows) the initial iteration, the first input set of entities corresponds to the second output set of entities identified in the initial iteration of the multiple iterations. Similarly, for a third iteration of the multiple iterations that follows (e.g., directly follows) the second iteration, the first input set of entities corresponds to the second output set of entities identified in the second iteration of the multiple iterations.

In some examples, for the first part of an iteration of the multiple iterations, the identification of the first output set of entities that are related to the first input set of entities is performed based upon a determination that each entity of the first output set of entities is associated with one or more events of the first plurality of events, where the one or more events comprise at least one event associated with each entity of the first input set of entities. For example, a fifth entity may be included in the first output set of entities based upon a determination that each entity of the first input set of entities performed at least one event of the first plurality of events with the fifth entity.

Alternatively and/or additionally, the identification of the first output set of entities that are related to the first input set of entities may be performed based upon a determination that each entity of the first output set of entities is associated with events of the first plurality of events, where the events comprise one or more events, amounting to at least a fourth threshold quantity of events, associated with each entity of the first input set of entities. For example, a fifth entity may be included in the first output set of entities based upon a determination that each entity of the first input set of entities performed one or more events, amounting to at least the fourth threshold quantity of events, with the fifth entity. In some examples, the fourth threshold quantity of events may vary across iterations of the multiple iterations. For example, the fourth threshold quantity of events used for performing an iteration of the multiple iterations may be different than the fourth threshold quantity of events used for performing a different iteration of the multiple iterations.

Alternatively and/or additionally, the identification of the first output set of entities that are related to the first input set of entities may be performed based upon a determination that each entity of the first output set of entities is associated with one or more events of the first plurality of events, where the one or more events comprise at least one event associated with each entity of a third threshold proportion of the first input set of entities. For example, the fifth entity may be included in the first output set of entities based upon a determination that each entity of one or more entities of the first input set of entities performed at least one event of the first plurality of events with the fifth entity, where the one or more entities make up at least the third threshold proportion of the first input set of entities. In some examples, the third threshold proportion may vary across iterations of the multiple iterations. For example, the third threshold proportion used for performing an iteration of the multiple iterations may be different than the third threshold proportion used for performing a different iteration of the multiple iterations.

Alternatively and/or additionally, the identification of the first output set of entities that are related to the first input set of entities may be performed based upon a determination that each entity of the first output set of entities is associated with events of the first plurality of events, where the events comprise one or more events, amounting to at least the fourth threshold quantity of events, associated with each entity of the third threshold proportion of the first input set of entities. For example, the fifth entity may be included in the first output set of entities based upon a determination that each entity of one or more entities of the first input set of entities performed one or more events, amounting to at least the fourth threshold quantity of events, with the fifth entity, where the one or more entities make up at least the third threshold proportion of the first input set of entities.

In some examples, for the second part of an iteration of the multiple iterations, the identification of the second output set of entities that are related to the first output set of entities is performed based upon a determination that each entity of the second output set of entities is associated with one or more events of the first plurality of events, where the one or more events comprise at least one event associated with each entity of the first output set of entities. For example, a sixth entity may be included in the second output set of entities based upon a determination that each entity of the first output set of entities performed at least one event of the first plurality of events with the sixth entity.

Alternatively and/or additionally, the identification of the second output set of entities that are related to the first output set of entities may be performed based upon a determination that each entity of the second output set of entities is associated with events of the first plurality of events, where the events comprise one or more events, amounting to at least a fifth threshold quantity of events, associated with each entity of the first output set of entities. For example, a sixth entity may be included in the second output set of entities based upon a determination that each entity of the first output set of entities performed one or more events, amounting to at least the fifth threshold quantity of events, with the sixth entity. In some examples, the fifth threshold quantity of events may vary across iterations of the multiple iterations. For example, the fifth threshold quantity of events used for performing an iteration of the multiple iterations may be different than the fifth threshold quantity of events used for performing a different iteration of the multiple iterations.

Alternatively and/or additionally, the identification of the second output set of entities that are related to the first output set of entities may be performed based upon a determination that each entity of the second output set of entities is associated with one or more events of the first plurality of events, where the one or more events comprise at least one event associated with each entity of a fourth threshold proportion of the first output set of entities. For example, the sixth entity may be included in the second output set of entities based upon a determination that each entity of one or more entities of the first output set of entities performed at least one event of the first plurality of events with the sixth entity, where the one or more entities make up at least the fourth threshold proportion of the first output set of entities. In some examples, the fourth threshold proportion may vary across iterations of the multiple iterations. For example, the fourth threshold proportion used for performing an iteration of the multiple iterations may be different than the fourth threshold proportion used for performing a different iteration of the multiple iterations.

Alternatively and/or additionally, the identification of the second output set of entities that are related to the first output set of entities may be performed based upon a determination that each entity of the second output set of entities is associated with events of the first plurality of events, where the events comprise one or more events, amounting to at least the fifth threshold quantity of events, associated with each entity of the fourth threshold proportion of the first output set of entities. For example, the sixth entity may be included in the second output set of entities based upon a determination that each entity of one or more entities of the first output set of entities performed one or more events, amounting to at least the fifth threshold quantity of events, with the sixth entity, where the one or more entities make up at least the fourth threshold proportion of the first output set of entities.

FIG. 7B illustrates performance of two iterations of the multiple iterations (shown with reference number 712 in FIG. 7B). In some examples, the initial iteration (shown as "ITERATION 1" in FIG. 7B) of the multiple iterations 712 is performed, where the first input set of entities of the initial iteration corresponds to the third set of entities 708. In some examples, using one or more of the techniques presented herein, the first network profile may be analyzed to identify the first output set of entities 714 of the initial iteration that are related to the third set of entities 708. Alternatively and/or additionally, the first network profile may be analyzed to identify the second output set of entities 716 of the initial iteration that are related to the first output set of entities 714 of the initial iteration.

In some examples, a subsequent iteration (shown as "ITERATION 2" in FIG. 7B) of the multiple iterations 712 is performed, where the first input set of entities of the subsequent iteration corresponds to the second output set of entities 716 identified in the initial iteration. The subsequent iteration may follow (e.g., directly follow) the initial iteration. In some examples, using one or more of the techniques presented herein, the first network profile may be analyzed to identify the first output set of entities 718 of the subsequent iteration that are related to the second output set of entities 716 of the initial iteration. Alternatively and/or additionally, the first network profile may be analyzed to identify the second output set of entities 720 of the subsequent iteration that are related to the first output set of entities 718 of the subsequent iteration.

In some examples, the multiple iterations are performed until at least one of a difference between the first output set of entities identified in a fourth iteration of the multiple iterations and the first output set of entities identified in a fifth iteration of the multiple iterations does not exceed a first threshold difference, or a difference between the second output set of entities identified in a sixth iteration of the multiple iterations and the second output set of entities identified in a seventh iteration of the multiple iterations does not exceed a second threshold difference. Alternatively and/or additionally, the multiple iterations may be performed until a maximum number of iterations are performed.

In some examples, for a current iteration of the multiple iterations, responsive to performing the first part of the current iteration, the first output set of entities identified in the first part of the current iteration (referred to as "first output entities 1" in the following examples) may be compared with the first output set of entities identified in a preceding iteration (referred to as "first output entities 2" in the following examples) to determine a difference between the first output entities 1 and the first output entities 2. The preceding iteration may correspond to an iteration that precedes (e.g., directly precedes and/or does not directly precede) the current iteration. Responsive to a determination that the difference exceeds the first threshold difference, the second part of the current iteration may be performed and/or one or more further iterations of the multiple iterations may be performed. Alternatively and/or additionally, responsive to a determination that the difference does not exceed the first threshold difference, the second part of the current iteration may not be performed and/or the multiple iterations may stop being performed.

In some examples, the difference may correspond to a difference in entities between the first output entities 1 and the first output entities 2. For example, the difference may correspond to the first output entities 1 comprising one or more entities that are not comprised in the first output entities 2. Alternatively and/or additionally, the difference may correspond to the first output entities 2 comprising one or more entities that are not comprised in the first output entities 1.

In a first example, the first threshold difference corresponds to zero difference between the first output entities 1 and the first output entities 2. Accordingly, in the first example, it may be determined that the difference does not exceed the first threshold difference if each entity comprised in the first output entities 1 is also comprised in the first output entities 2 and/or if each entity comprised in the first output entities 2 is also comprised in the first output entities 1.

In a second example, the first threshold difference corresponds to a threshold quantity of entities that are comprised in the first output entities 1 but not comprised in the first output entities 2. Accordingly, in the second example, it may be determined that the difference does not exceed the first threshold difference if one or more entities comprised in the first output entities 1 are not comprised in the first output entities 2 and a quantity of entities of the one or more entities does not exceed the threshold quantity of entities.

In a third example, the first threshold difference corresponds to a threshold quantity of entities that are comprised in the first output entities 2 but not comprised in the first output entities 1. Accordingly, in the third example, it may be determined that the difference does not exceed the first threshold difference if one or more entities comprised in the first output entities 2 are not comprised in the first output entities 1 and a quantity of entities of the one or more entities does not exceed the threshold quantity of entities.

In some examples, for a current iteration of the multiple iterations, responsive to performing the second part of the current iteration, the second output set of entities identified in the second part of the current iteration (referred to as "second output entities 1" in the following examples) may be compared with the second output set of entities identified in a preceding iteration (referred to as "second output entities 2" in the following examples) to determine a difference between the second output entities 1 and the second output entities 2. The preceding iteration may correspond to an iteration that precedes (e.g., directly precedes and/or does not directly precede) the current iteration. Responsive to a determination that the difference exceeds the second threshold difference, one or more further iterations of the multiple iterations may be performed. Alternatively and/or additionally, responsive to a determination that the difference does not exceed the second threshold difference, one or more further iterations of the multiple iterations may not be performed and/or the multiple iterations may stop being performed.

In some examples, the difference may correspond to a difference in entities between the second output entities 1 and the second output entities 2. For example, the difference may correspond to the second output entities 1 comprising one or more entities that are not comprised in the second output entities 2. Alternatively and/or additionally, the difference may correspond to the second output entities 2 comprising one or more entities that are not comprised in the second output entities 1.

In a first example, the second threshold difference corresponds to zero difference between the second output entities 1 and the second output entities 2. Accordingly, in the first example, it may be determined that the difference does not exceed the second threshold difference if each entity comprised in the second output entities 1 is also comprised in the second output entities 2 and/or if each entity comprised in the second output entities 2 is also comprised in the second output entities 1.

In a second example, the second threshold difference corresponds to a threshold quantity of entities that are comprised in the second output entities 1 but not comprised in the second output entities 2. Accordingly, in the second example, it may be determined that the difference does not exceed the second threshold difference if one or more entities comprised in the second output entities 1 are not comprised in the second output entities 2 and a quantity of entities of the one or more entities does not exceed the threshold quantity of entities.

In a third example, the second threshold difference corresponds to a threshold quantity of entities that are comprised in the second output entities 2 but not comprised in the second output entities 1. Accordingly, in the third example, it may be determined that the difference does not exceed the second threshold difference if one or more entities comprised in the second output entities 2 are not comprised in the second output entities 1 and a quantity of entities of the one or more entities does not exceed the threshold quantity of entities.

It may be appreciated that rather than performing more than one iteration, merely a single iteration (such as merely the initial iteration) of the multiple iterations may be performed. For example, performance of the multiple iterations may comprise performance of any number of iterations, such as 1 iteration and/or more than 1 iteration.

At 614, a first coalition network associated with fraudulent activity may be determined based upon a fourth set of entities identified in the fourth iteration, the fifth iteration, the sixth iteration, the seventh iteration and/or one or more other iterations of the multiple iterations. For example, the fourth set of entities may comprise entities (e.g., the second output set of entities), of the first plurality of entities, identified in one or more first iterations of the multiple iterations. In some examples, the one or more first iterations may comprise one, some and/or all of the multiple iterations. In an example, the one or more first iterations may comprise one or more last performed iterations of the multiple iterations. Alternatively and/or additionally, the fourth set of entities may comprise entities (e.g., the first output set of entities), of the second plurality of entities, identified in one or more second iterations of the multiple iterations. In some examples, the one or more second iterations may comprise one, some and/or all of the multiple iterations. In an example, the one or more second iterations may comprise one or more last performed iterations of the multiple iterations. The fourth set of entities may be identified and/or recognized as being a network of entities used for performing fraudulent activity based upon the identification of the fourth set of entities in the multiple iterations performed in the first iterative process.

In some examples, the first coalition network may comprise all entities of the fourth set of entities. Alternatively and/or additionally, the first coalition network may comprise a subset of entities of the fourth set of entities. In some examples, one or more entities of the fourth set of entities may be excluded from the first coalition network (e.g., the one or more entities may not be included in the first coalition network). For example, an entity of the fourth set of entities may be excluded from the first coalition network based upon a determination that the entity is included in a list of non-fraudulent entities. For example, the list of non-fraudulent entities may be indicative of entities that are not associated with fraudulent activity, such as entities associated with internet resources that are owned and/or operated by a company associated with the content system and/or entities associated with internet resources that are owned and/or operated by a company determined to be reputable.

In some examples, the fourth set of entities may be analyzed to determine whether duplicates are present in the fourth set of entities, such as where an entity is listed and/or included more than once in the fourth set of entities. Duplications may be identified and/or removed, such as using one or more deduplication techniques, such that the first coalition network does not comprise duplicates.

In some examples, the first coalition network and/or one or more other coalition networks may be determined by performing one or more iterative processes associated with one or more other entities of the second plurality of entities. For example, multiple iterative processes, comprising the first iterative process, may be performed. Similar to the first iterative process beginning with identification of the first set of entities that are related to the second entity, each iterative process of the multiple iterative processes may begin with identification of a set of entities that are related to an entity of the second plurality of entities and/or the first plurality of entities, where the entity may be different for each iterative process of the multiple iterative processes. In an example, a second iterative process of the multiple iterative processes may be performed with respect to a seventh entity of the second plurality of entities, where the second iterative process begins with identification of a set of entities (of the first plurality of entities) that are related to the seventh entity. In another example, a third iterative process of the multiple iterative processes may be performed with respect to an eighth entity of the first plurality of entities, where the third iterative process begins with identification of a set of entities (of the second plurality of entities) that are related to the eighth entity. Iterative processes of the multiple iterative processes may be performed with respect to each entity of at least some of the first plurality of entities and/or the second plurality of entities.

In some examples, for each entity of the first plurality of entities, an iterative process of the multiple iterative processes may be performed with respect to the entity and/or the iterative process may begin with identification of a set of entities (of the second plurality of entities) that are related to the entity. In some examples, for each entity of the second plurality of entities, an iterative process of the multiple iterative processes may be performed with respect to the entity and/or the iterative process may begin with identification of a set of entities (of the first plurality of entities) that are related to the entity.

Iterative processes of the multiple iterative processes may be performed using one or more of the techniques described herein with respect to the first iterative process. Similar to the identification of the fourth set of entities in the first iterative process, a set of entities may be identified in a different iterative process of the multiple iterative process. For example, performance of an iterative process of the multiple iterative processes may result in identification of a set of entities associated with fraudulent activity. Alternatively and/or additionally, performance of the multiple iterative processes may result in identification of a plurality of sets of entities associated with fraudulent activity. Each set of entities of the plurality of sets of entities may be identified in an iterative process of the multiple iterative processes. The plurality of sets of entities may comprise at least one of the fourth set of entities identified in the first iterative process, a fifth set of entities identified in the second iterative process, a sixth set of entities identified in the third iterative process, etc.

In some examples, the first network profile may be analyzed based upon the plurality of sets of entities to identify one or more groups of sets of entities (to merge sets of entities together for coalition network identification, for example). A group of sets of entities of the one or more groups of sets of entities may correspond to sets of entities, of the plurality of sets of entities, that are related to each other. For example, the first network profile may be analyzed based upon the fourth set of entities and one or more other sets of entities of the plurality of sets of entities to determine whether the fourth set of entities are related to the one or more other sets of entities. The fourth set of entities and one or more other sets of entities may be included in a first group of sets of entities based upon a determination that the fourth set of entities is related to the one or more other sets of entities.

In some examples, a determination that the fourth set of entities and the one or more other sets of entities of the first group of sets of entities are related is determined based upon a determination that the fourth set of entities comprises entities also comprised in the one or more other sets of entities. In an example, the first group of sets of entities may comprise a sixth set of entities. The sixth set of entities may be included in the first group of sets of entities based upon a determination that the fourth set of entities and the sixth set of entities are related. The determination that the fourth set of entities and the sixth set of entities are related may be based upon a determination that the fourth set of entities comprises one or more first entities also comprised in the sixth set of entities. Alternatively and/or additionally, the determination that the fourth set of entities and the sixth set of entities are related may be based upon a determination that the one or more first entities meet a threshold quantity of entities. Alternatively and/or additionally, the determination that the fourth set of entities and the sixth set of entities are related may be based upon a determination that the one or more first entities meet a threshold proportion of the fourth set of entities and/or the sixth set of entities. For example, the one or more first entities may meet the threshold proportion if the one or more first entities correspond to at least the threshold proportion of the fourth set of entities and/or the one or more first entities correspond to at least the threshold proportion of the sixth set of entities. Alternatively and/or additionally, the one or more first entities may meet the threshold proportion if the one or more first entities correspond to at least the threshold proportion of a combination of the fourth set of entities and the sixth set of entities.

In some examples, the first coalition network may be determined based upon the first group of sets of entities. For example, the first group of sets of entities may be identified and/or recognized as being a network of entities used for performing fraudulent activity based upon the determination that the fourth set of entities and the one or more other sets of entities are related. In some examples, the first coalition network may comprise all entities of the first group of sets of entities. Alternatively and/or additionally, the first coalition network may comprise a subset of entities of the first group of sets of entities.

In some examples, one or more entities of the first group of sets of entities may be excluded from the first coalition network (e.g., the one or more entities may not be included in the first coalition network). For example, an entity of the first group of sets of entities may be excluded from the first coalition network based upon a determination that the entity is included in the list of non-fraudulent entities.

In some examples, the first group of sets of entities may be analyzed to determine whether duplicates are present in the first group of sets of entities, such as where an entity is listed more than once and/or where an entity is included in more than one set of entities of the group of sets of entities. Duplications may be removed, such as using one or more deduplication techniques, such that the first coalition network does not comprise duplicates.

It may be appreciated that the method 600 may be performed without generation of the first network profile. In some examples, rather than (and/or in addition to) analyzing the first network profile to identify the first set of entities, the second set of entities, the third set of entities the first output set of entities and/or the second output set of entities, the first plurality of sets of event information may be analyzed to identify the first set of entities, the second set of entities, the third set of entities the first output set of entities and/or the second output set of entities.

In some examples, the content system may control transmission and/or reception of data (such as transmission of content items) based upon identification of a first coalition network, for example the first coalition network identified using one or more of the techniques described with respect to the method 400 of FIG. 4 and/or the first coalition network identified using one or more of the techniques described with respect to the method 600 of FIG. 6.

In some examples, a first request for content associated with a first client device and/or a first internet resource may be received by the content system. For example, the first request for content may be a request for the content system to provide a content item (e.g., an advertisement, an image, a link, a video, etc.) for presentation via the first client device using the first internet resource.

In some examples, a first entity associated with the first client device and/or a second entity associated with the first internet resource may be determined based upon the first request for content. For example, the first request for content may comprise an indication of the first entity and/or the second entity. The first entity may correspond to at least one of the first client device, an IP address associated with the first client device, a carrier identifier indicative of carrier information associated with the first client device, a user identifier (e.g., at least one of a username, an email address, a user account identifier, etc.) associated with the first client device, a browser cookie, etc. The second entity may correspond to at least one of one or more first internet resources comprising the first internet resource, an internet resource identifier associated with the one or more first internet resources, a domain associated with the one or more first internet resources, a host identifier of a host device associated with the one or more first internet resources, a publisher identifier associated with a publisher of the one or more first internet resources, etc.

In some examples, the first coalition network may be analyzed based upon the first entity and/or the second entity to determine whether the first coalition network comprises the first entity and/or the second entity. In some examples, a content item associated with the first request for content may not be transmitted to the first client device based upon a determination that both the first entity and the second entity are part of the first coalition network. For example, the determination that both the first entity and the second entity are part of the first coalition network may correspond to a determination that the first entity and the second entity are being used together for performance of fraudulent activity, such as advertising fraud, and/or that reception of the first request for content is a result of such fraudulent activity.

In some examples, a content item associated with the first request for content may not be transmitted to the first client device based upon a determination that merely the first entity associated with the first client device is part of the first coalition network (and/or the second entity associated with the first internet resource is not part of the first coalition network). In some examples, device activity associated with the first client device may be analyzed to determine a first fraud level associated with the first entity. The device activity may comprise historical activity information indicative of historical events in which the first client device presented content items provided by the content system. In some examples, the first fraud level may be determined based upon a first activity level, of the first client device, with entities that are not part of an identified coalition network. In an example, the first activity level may be based upon a quantity of events performed by the first client device with entities that are not part of an identified coalition network. Alternatively and/or additionally, the first activity level may be based upon a rate at which events are performed by the first client device with entities that are not part of an identified coalition network.

In some examples, a lower level of the first activity level may correspond to a higher level of the first fraud level. For example, a determination that the first client device has a low activity level with entities that are not part of identified coalition networks may correspond to a high likelihood that the first client device is exclusively (and/or mainly) used for performance of fraudulent activity with entities of one or more coalition networks.

Alternatively and/or additionally, a higher level of the first activity level may correspond to a lower level of the first fraud level. For example, a determination that the first client device has a high activity level with entities that are not part of the identified coalition networks may correspond to a high likelihood that the first client device is not exclusively (and/or mainly) used for performance of fraudulent activity with entities of one or more coalition networks. For example, the first entity associated with the first client device may be included in the first coalition network due to a computer virus, malware, a botnet, a Trojan horse, etc. controlling the first client device perform fraudulent activity with entities of the first coalition network. However, other activity of the first client device that is not performed in association with entities of the first coalition network may not be fraudulent.

In some examples, responsive to a determination that merely the first entity associated with the first client device is part of the first coalition network (and/or the second entity associated with the first internet resource is not part of the first coalition network), the first fraud level associated with the first entity may be compared with a first threshold fraud level. A content item associated with the first request for content may not be transmitted to the first client device responsive to determining that the first fraud level associated with the first entity exceeds the first threshold fraud level. Alternatively and/or additionally, a content item associated with the first request for content may be selected (via a bidding process, for example) and/or transmitted to the first client device responsive to determining that the first fraud level associated with the first entity does not exceed the first threshold fraud level.

Alternatively and/or additionally, responsive to a determination that the first entity associated with the first client device is part of the first coalition network, a content item associated with the first request for content may be selected, based upon the first fraud level, for presentation via the first client device. For example, the first fraud level may be submitted to a bidding system. A plurality of bid values associated with a plurality of content items may be generated based upon the first fraud level. A content item may be selected from the plurality of content items for presentation via the first client device based upon the plurality of bid values, such as using one or more of the techniques described herein with respect to FIGS. 5A-5E. In a first example, the first fraud level may be equal to a first value and/or a first bid value, of the plurality of bid values, associated with a content item of the plurality of content items may be generated based upon the first value. In a second example, the first fraud level may be equal to a second value, lower than the first value, and/or a second bid value associated with the content item may be generated based upon the second value. The first bid value in the first example may be lower than the second bid value in the second example (as a result of the first fraud level in the first example being higher than the first fraud level in the second example).

In some examples, a content item associated with the first request for content may not be transmitted to the first client device based upon a determination that merely the second entity associated with the first internet resource is part of the first coalition network (and/or the first entity associated with the first client device is not part of the first coalition network). In some examples, historical activity associated with the one or more first internet resources (comprising the first internet resource) may be analyzed to determine a second fraud level associated with the second entity. The historical activity may be determined based upon historical activity information indicative of historical events in which the one or more first internet resources were used to present content items provided by the content system. In some examples, the second fraud level may be determined based upon a second activity level, of the one or more first internet resources, with entities that are not part of an identified coalition network. In an example, the second activity level may be based upon a quantity of events performed by the one or more first internet resources with entities that are not part of an identified coalition network. Alternatively and/or additionally, the second activity level may be based upon a rate at which events are performed by the one or more first internet resources with entities that are not part of an identified coalition network.

In some examples, a lower level of the second activity level may correspond to a higher level of the second fraud level. For example, a determination that the one or more first internet resources have a low activity level with entities that are not part of identified coalition networks may correspond to a high likelihood that the one or more first internet resources are exclusively (and/or mainly) used for performance of fraudulent activity with entities of one or more coalition networks.

Alternatively and/or additionally, a higher level of the second activity level may correspond to a lower level of the second fraud level. For example, a determination that the one or more first internet resources have a high activity level with entities that are not part of the identified coalition networks may correspond to a high likelihood that the first client device is not exclusively (and/or mainly) used for performance of fraudulent activity with entities of one or more coalition networks.

In some examples, responsive to a determination that merely the second entity associated with the first internet resource is part of the first coalition network (and/or the first entity associated with the first client device is not part of the first coalition network), the second fraud level associated with the second entity may be compared with a second threshold fraud level. A content item associated with the first request for content may not be transmitted to the first client device responsive to determining that the second fraud level associated with the second entity exceeds the second threshold fraud level. Alternatively and/or additionally, a content item associated with the second request for content may be selected (via a bidding process, for example) and/or transmitted to the first client device responsive to determining that the second fraud level associated with the second entity does not exceed the second threshold fraud level.

Alternatively and/or additionally, responsive to a determination that the second entity associated with the first internet resource is part of the first coalition network, a content item associated with the first request for content may be selected, based upon the second fraud level, for presentation via the first client device. For example, the second fraud level may be submitted to a bidding system. A plurality of bid values associated with a plurality of content items may be generated based upon the second fraud level. A content item may be selected from the plurality of content items for presentation via the first client device based upon the plurality of bid values, such as using one or more of the techniques described herein, such as with respect to FIG. 5D.

It may be appreciated that the disclosed subject matter may prevent fraudulent activity, including, but not limited to, advertising fraud. For example, employing one or more of the techniques presented herein, such as at least one of analyzing activity associated with entities on a network-level (such as analyzing the first plurality of sets of event information), generating the first network profile associated with entities based upon the first plurality of sets of event information, generating representations associated with the entities, identifying clusters based upon the representations, identifying coalition networks based upon the clusters, performing iterative processes to identify coalition networks, etc., results in accurate identification of coalition networks associated with fraudulent activity. The coalition networks identified using one or more of the techniques presented herein may include entities that otherwise may have gone undetected using other systems, such as systems that attempt to detect fraud at an entity-level and/or an event-level and/or systems that analyze activity and/or traffic associated with a device and/or an advertisement signal to determine, such as based upon computation limits, whether the device and/or the advertisement signal is fraudulent. For example, such systems may not detect fraudulent entities of a coalition network because each individual entity may be controlled to look and/or act sufficiently like a legitimate user. Accordingly, it may be necessary to use one or more of the techniques herein to identify the entity as associated with a coalition network associated with fraudulent activity. Thus, by implementing one or more of the techniques herein, it may be more difficult for a malicious entity to perform fraudulent activity without being detected.

Further, malicious entities may be discouraged from performing malicious actions (e.g., using one or more automated operation functionalities, hacking techniques, malware, etc.) to control client devices for transmission of advertisement requests because, by implementing one or more of the techniques presented herein, it is more difficult for a malicious entity to successfully control a client device for transmission of a fraudulent advertisement request without being detected as part of a coalition network.

Implementation of at least some of the disclosed subject matter may lead to benefits including, but not limited to, a reduction in transmission of fraudulent advertisement requests (and/or a reduction in bandwidth) (e.g., as a result of discouraging malicious entities from performing malicious actions to control client devices for transmission of advertisement requests).

Alternatively and/or additionally, implementation of at least some of the disclosed subject matter may lead to benefits including a reduction in transmission of content items based upon fraudulent advertisement requests (and/or a reduction in bandwidth) (e.g., as a result of identifying a coalition network associated with fraudulent activity, as a result of controlling transmission of data, such as content items and/or advertisements, to entities of the coalition network based upon the identification of the coalition network, etc.).

Alternatively and/or additionally, implementation of at least some of the disclosed subject matter may lead to benefits including preventing malicious entities from receiving compensation for performing fraudulent activity (e.g., as a result of identifying a coalition network associated with fraudulent activity, as a result of controlling transmission of data, such as content items and/or advertisements, to entities of the coalition network based upon the identification of the coalition network, etc.).

Alternatively and/or additionally, implementation of at least some of the disclosed subject matter may lead to benefits including a reduction in instances that client devices are hacked and/or controlled for transmission of fraudulent advertisement requests (e.g., as a result of discouraging malicious entities from performing malicious actions to control client devices for transmission of fraudulent advertisement requests).

Alternatively and/or additionally, implementation of at least some of the disclosed subject matter may lead to benefits including reducing unauthorized access of client devices and/or the content system (e.g., as a result of discouraging malicious entities from performing malicious actions to control client devices for transmission of fraudulent advertisement requests). Alternatively and/or additionally, implementation of at least some of the disclosed subject matter may lead to benefits including decreasing security resources needed to protect client devices and/or the content system from unauthorized access.

In some examples, at least some of the disclosed subject matter may be implemented on a client device, and in some examples, at least some of the disclosed subject matter may be implemented on a server (e.g., hosting a service accessible via a network, such as the Internet).

Figure 8:
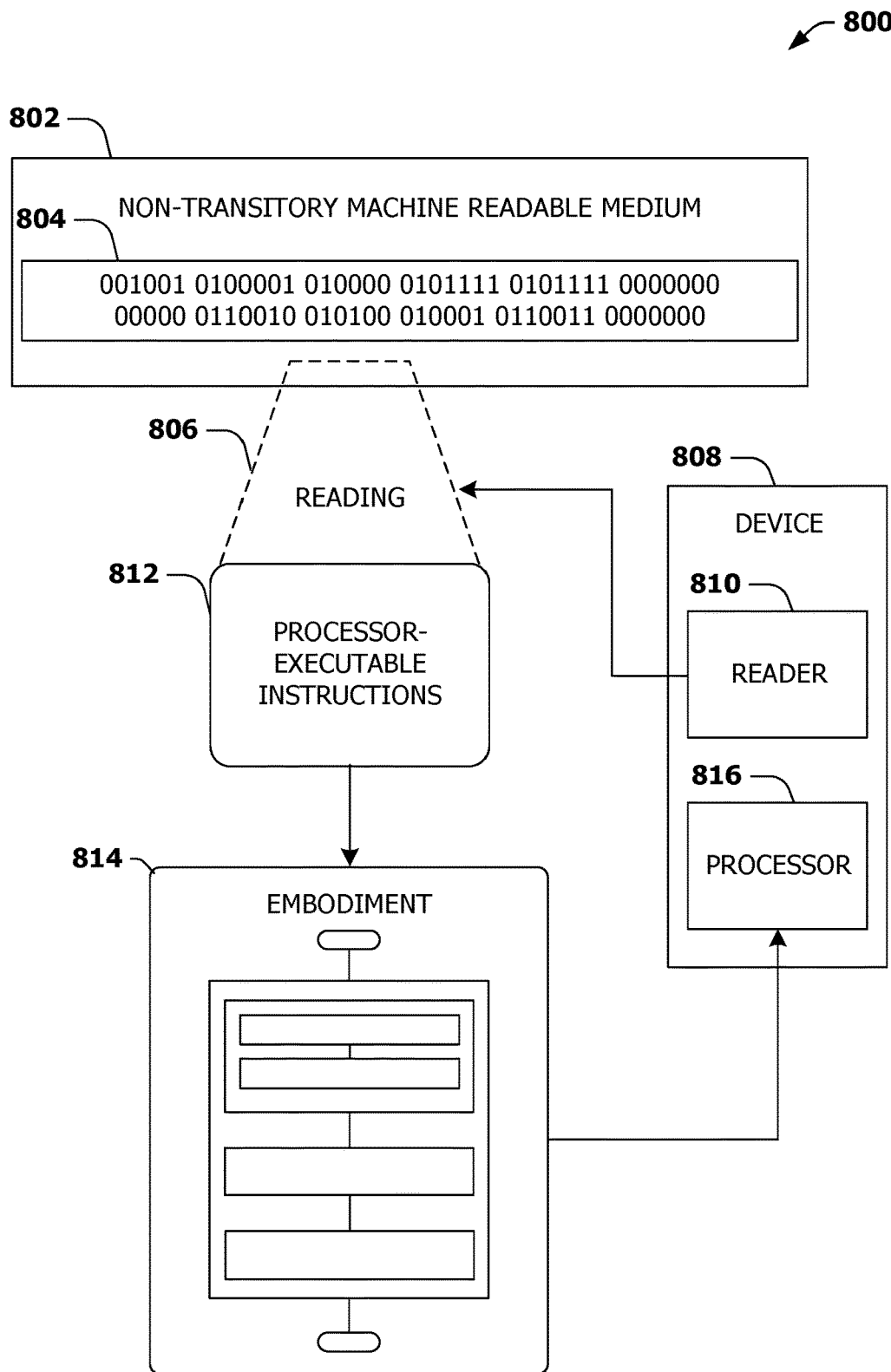
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIG. 4 and/or the example method 600 of FIG. 6, for example. In some embodiments, the processor-executable instructions 812 are configured to cause implementation of a system, such as at least some of the exemplary system 501 of FIGS. 5A-5H and/or the exemplary system 701 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying a first plurality of sets of event information associated with a first plurality of events, wherein:
      the first plurality of events is associated with a first plurality of entities corresponding to a first entity type and a second plurality of entities corresponding to a second entity type;
      a first set of event information of the first plurality of sets of event information is associated with a first event of the first plurality of events; and
      the first set of event information is indicative of:
         a first entity, of the first plurality of entities, associated with the first event; and
         a second entity, of the second plurality of entities, associated with the first event;
   generating, based upon the first plurality of sets of event information, a first network profile associated with the first plurality of entities and the second plurality of entities, wherein the first network profile is indicative of one or more first sets of event metrics associated with the second entity and a first set of entities comprising the first entity, wherein:
      the first plurality of entities comprises the first set of entities; and
      a first set of event metrics of the one or more first sets of event metrics corresponds to a measure of events associated with the first entity and the second entity;
   at least one of:
      analyzing the first network profile to identify a first output set of entities, of the second plurality of entities, that are related to a first input set of entities; or
      analyzing the first network profile to identify a second output set of entities, of the first plurality of entities, that are related to the first output set of entities; and
   identifying a coalition network associated with fraudulent activity based upon one or more first entities identified in at least one of the analyzing the first network profile to identify the first output set of entities or the analyzing the first network profile to identify the second output set of entities.

2. The method of claim 1, wherein a third entity of the one or more first entities is associated with a first client device, the method comprising:
   receiving a first request for content associated with the first client device; and
   not transmitting a content item, associated with the first request for content, to the first client device based upon a determination that the third entity is associated with the coalition network.

3. The method of claim 1, wherein a third entity of the one or more first entities is associated with a first internet resource, the method comprising:
   receiving a first request associated with a first client device, wherein the first request corresponds to a request for content to be presented via the first internet resource; and
   not transmitting a content item, associated with the first request for content, to the first client device based upon a determination that the third entity is associated with the coalition network.

4. The method of claim 1, wherein a third entity of the one or more first entities is associated with a first client device and a fourth entity of the one or more first entities is associated with a first internet resource, the method comprising:
   receiving a first request associated with the first client device, wherein the first request corresponds to a request for content to be presented via the first internet resource; and
   not transmitting a content item, associated with the first request for content, to the first client device based upon a determination that the third entity and the fourth entity are associated with the coalition network.

5. The method of claim 1, wherein:
   the identification of the first set of entities that are related to the second entity is performed based upon a determination that each entity of the first set of entities is associated with one or more events, of the first plurality of events, associated with the second entity.

6. The method of claim 1, wherein:
   the identification of the first output set of entities that are related to the first input set of entities is performed based upon a determination that each entity of the first output set of entities is associated with one or more events of the first plurality of events, wherein the one or more events comprise at least one event associated with each entity of the first input set of entities.

7. The method of claim 1, wherein:
   the identification of the second output set of entities that are related to the first output set of entities is performed based upon a determination that each entity of the second output set of entities is associated with one or more events of the first plurality of events, wherein the one or more events comprise at least one event associated with each entity of the first output set of entities.

8. The method of claim 1, wherein:
   the identification of the first output set of entities that are related to the first input set of entities is performed based upon a determination that each entity of the first output set of entities is associated with one or more events of the first plurality of events, wherein the one or more events comprise at least one event associated with each entity of a first threshold proportion of the first input set of entities.

9. The method of claim 1, wherein:
   the identification of the second output set of entities that are related to the first output set of entities is performed based upon a determination that each entity of the second output set of entities is associated with one or more events of the first plurality of events, wherein the one or more events comprise at least one event associated with each entity of a second threshold proportion of the first output set of entities.

10. The method of claim 1, wherein:
    an event of the first plurality of events corresponds to at least one of:
       a presentation of a first content item via a first client device; or
       a selection of a second content item via a second client device.

11. The method of claim 1, wherein:
    an entity of the first plurality of entities is associated with a client device; and an entity of the second plurality of entities is associated with an internet resource.

12. The method of claim 1, wherein:
an entity of the first plurality of entities is associated with an internet resource; and
an entity of the second plurality of entities is associated with a client device.

13. A computing device comprising:
a processor; and
memory comprising processor-executable instructions that when executed by the processor cause performance of operations, the operations comprising:
identifying a first plurality of sets of event information associated with a first plurality of events, wherein:
the first plurality of events is associated with a first plurality of entities corresponding to a first entity type and a second plurality of entities corresponding to a second entity type;
a first set of event information of the first plurality of sets of event information is associated with a first event of the first plurality of events; and
the first set of event information is indicative of:
a first entity, of the first plurality of entities, associated with the first event; and
a second entity, of the second plurality of entities, associated with the first event; and
at least one of:
analyzing the first plurality of sets of event information to identify a first output set of entities, of the second plurality of entities, that are related to a first input set of entities; or
analyzing the first plurality of sets of event information to identify a second output set of entities, of the first plurality of entities, that are related to the first output set of entities.

14. The computing device of claim 13, wherein a third entity of one or more first entities is associated with a first client device, the operations comprising:
receiving a first request for content associated with the first client device; and
not transmitting a content item, associated with the first request for content, to the first client device based upon a determination that the third entity is associated with a coalition network.

15. The computing device of claim 13, wherein a third entity of one or more first entities is associated with a first internet resource, the operations comprising:
receiving a first request associated with a first client device, wherein the first request corresponds to a request for content to be presented via the first internet resource; and
not transmitting a content item, associated with the first request for content, to the first client device based upon a determination that the third entity is associated with a coalition network.

16. The computing device of claim 13, wherein a third entity of one or more first entities is associated with a first client device and a fourth entity of the one or more first entities is associated with a first internet resource, the operations comprising:
receiving a first request associated with the first client device, wherein the first request corresponds to a request for content to be presented via the first internet resource; and
not transmitting a content item, associated with the first request for content, to the first client device based upon a determination that the third entity and the fourth entity are associated with a coalition network.

17. A non-transitory machine readable medium having stored thereon processor-executable instructions that when executed cause performance of operations, the operations comprising:
identifying a first plurality of sets of event information associated with a first plurality of events, wherein:
the first plurality of events is associated with a first plurality of entities corresponding to a first entity type and a second plurality of entities corresponding to a second entity type;
a first set of event information of the first plurality of sets of event information is associated with a first event of the first plurality of events; and
the first set of event information is indicative of:
a first entity, of the first plurality of entities, associated with the first event; and
a second entity, of the second plurality of entities, associated with the first event;
generating, based upon the first plurality of sets of event information, a first network profile associated with the first plurality of entities and the second plurality of entities, wherein the first network profile is indicative of one or more first sets of event metrics associated with the second entity and a first set of entities comprising the first entity, wherein:
the first plurality of entities comprises the first set of entities; and
a first set of event metrics of the one or more first sets of event metrics corresponds to a measure of events associated with the first entity and the second entity; and
at least one of:
analyzing the first network profile to identify a first output set of entities, of the second plurality of entities, that are related to a first input set of entities; or
analyzing the first network profile to identify a second output set of entities, of the first plurality of entities, that are related to the first output set of entities.

18. The non-transitory machine readable medium of claim 17, wherein a third entity of one or more first entities is associated with a first client device, the operations comprising:
receiving a first request for content associated with the first client device; and
not transmitting a content item, associated with the first request for content, to the first client device based upon a determination that the third entity is associated with a coalition network.

19. The non-transitory machine readable medium of claim 17, wherein a third entity of one or more first entities is associated with a first internet resource, the operations comprising:
receiving a first request associated with a first client device, wherein the first request corresponds to a request for content to be presented via the first internet resource; and
not transmitting a content item, associated with the first request for content, to the first client device based upon a determination that the third entity is associated with a coalition network.

20. The non-transitory machine readable medium of claim 17, wherein a third entity of one or more first entities is associated with a first client device and a fourth entity of the one or more first entities is associated with a first internet resource, the operations comprising:
- receiving a first request associated with the first client device, wherein the first request corresponds to a request for content to be presented via the first internet resource; and
- not transmitting a content item, associated with the first request for content, to the first client device based upon a determination that the third entity and the fourth entity are associated with a coalition network.

* * * * *